(12) United States Patent
Pandey et al.

(10) Patent No.: US 8,880,524 B2
(45) Date of Patent: Nov. 4, 2014

(54) SCALABLE REAL TIME EVENT STREAM PROCESSING

(75) Inventors: Vipul Pandey, Sunnyvale, CA (US); Gopi Rangaswamy, Sunnyvale, CA (US); Jordan Redner, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 555 days.

(21) Appl. No.: 12/505,228

(22) Filed: Jul. 17, 2009

(65) Prior Publication Data

US 2011/0016123 A1    Jan. 20, 2011

(51) Int. Cl.
*G06F 17/30* (2006.01)

(52) U.S. Cl.
CPC .............................. *G06F 17/30348* (2013.01)
USPC ........... 707/737; 707/799; 709/207; 709/224; 719/318

(58) Field of Classification Search
USPC ............ 707/737, 799; 709/207, 224; 719/318
See application file for complete search history.

(56) References Cited

U.S. PATENT DOCUMENTS

| | | | |
|---|---|---|---|
| 7,792,948 B2 * | 9/2010 | Zhao et al. | 709/224 |
| 2004/0139166 A1 * | 7/2004 | Collison | 709/207 |
| 2004/0240462 A1 * | 12/2004 | T V et al. | 370/432 |
| 2006/0015624 A1 * | 1/2006 | Smith et al. | 709/227 |
| 2009/0070786 A1 * | 3/2009 | Alves et al. | 719/318 |

\* cited by examiner

*Primary Examiner* — Etienne Leroux
*Assistant Examiner* — Cindy Nguyen
(74) *Attorney, Agent, or Firm* — Fish & Richardson P.C.

(57) ABSTRACT

Scalable systems and methods for near real time processing of a substantial volume of event data streams are disclosed. A concurrent throughput receiver is coupled to an input of a processor for receiving the substantial volume of event data streams, and implementing substantially concurrent throughput of the substantial volume of event data streams. The systems and methods may provide for real time application monitoring, such as by aggregating information to a distributed cache from a plurality of entities, where the entities are structured in a nodal hierarchy, and summarizing to a summary database the information from the nodal hierarchy into summary level statistics for each of the nodes of the nodal hierarchy.

31 Claims, 11 Drawing Sheets

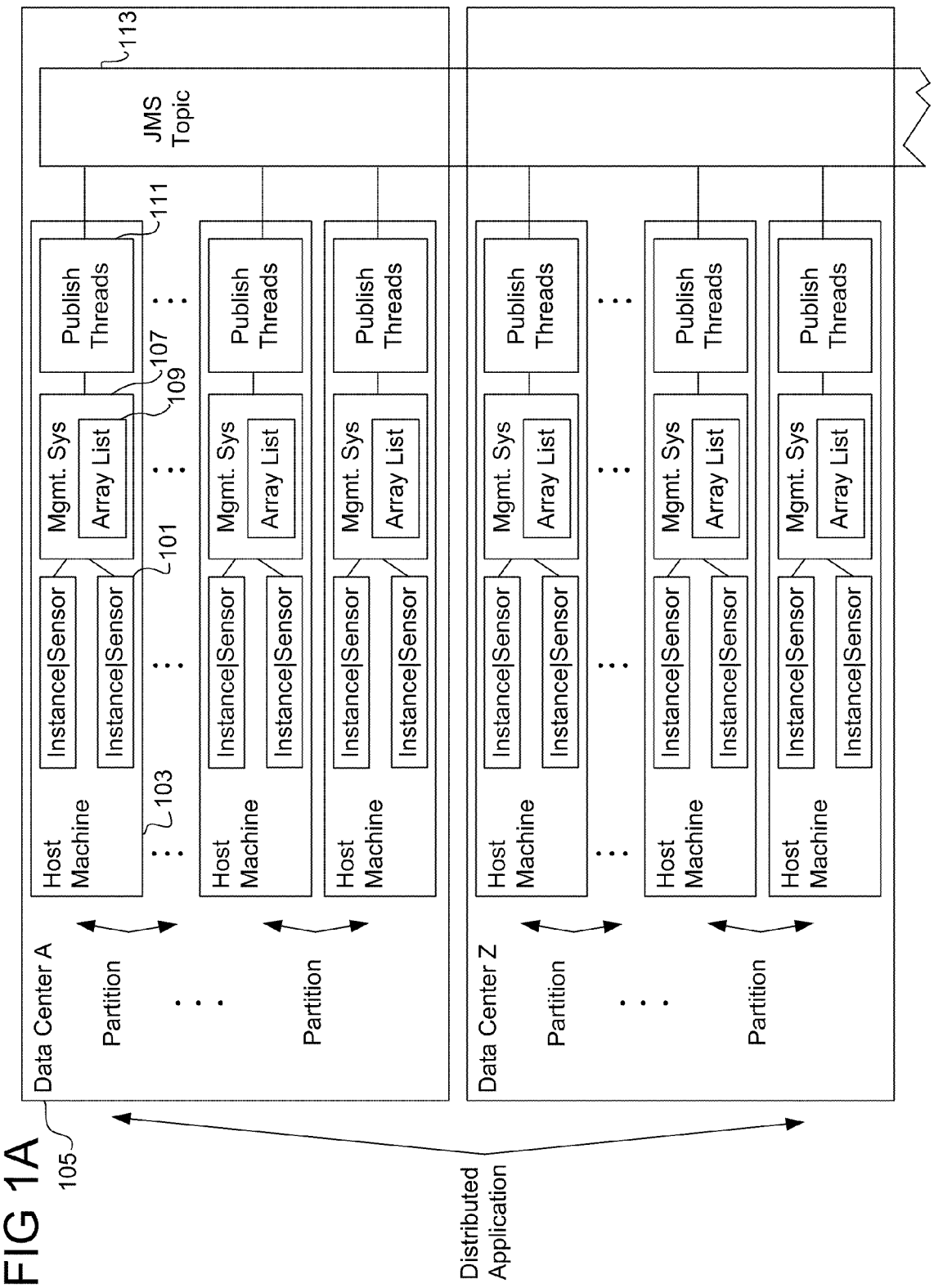

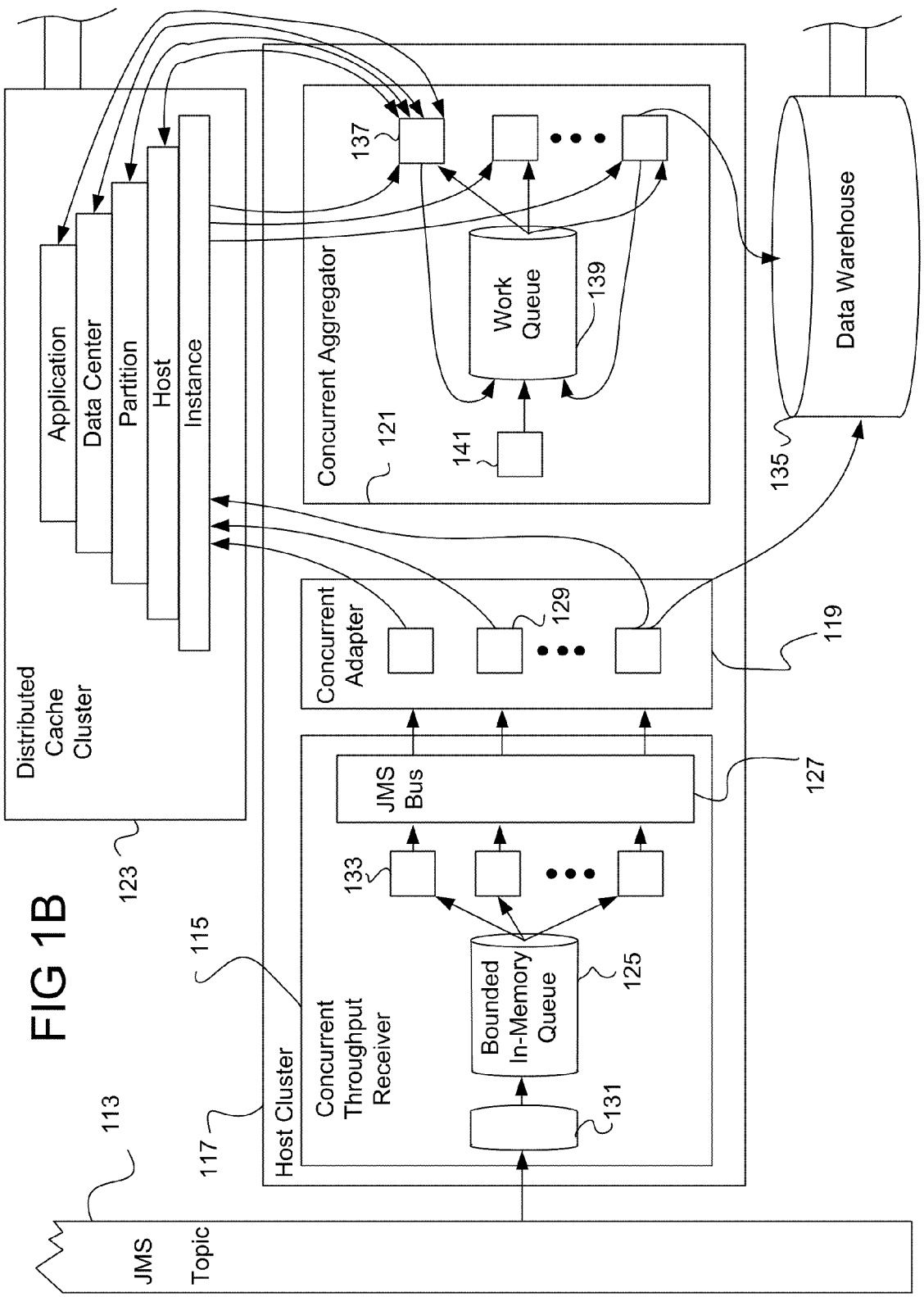

SCALABLE REAL TIME EVENT STREAM PROCESSING

BACKGROUND OF THE INVENTION

1. Field of the Invention

The present invention relates to event stream processing and, more particularly, to systems and methods for scalable real time processing of a substantial volume of event data streams.

2. Description of the Related Art

Relational database management systems have become an essential part of the U.S. and world economy. Once historical data has been stored in the database, it can be queried in various ways, to provide for decision support. While traditional relational database management systems have many advantages, some challenges still remain.

Modern enterprises now generate an enormous number of events, and an enormous amount of corresponding event data. For example, although e-commerce and Radio-Frequency Identification tags have potential to automate transactions and help in supply chain management, large scale adoption of e-commerce services and RFID services may generate an overwhelming number of events, and an overwhelming amount of event data.

In addition to such difficulties, some sectors of services additionally require real time processing, or near real time processing, of event data streams. Financial services events, for example events related to the buying and selling of positions in stock markets, may need to process streams of data for buy/sell price events quickly, to support financial transactions. Furthermore, it should be understood that such real time (or near real time) processing may be highly desirable, or may provide very compelling business advantages, for many kinds of services.

Recent advances in healthcare services can rapidly generate important events (and corresponding important event data) in automated patient monitoring or testing, e-prescriptions, and electronic medical records. Additional event examples are security services events, which include, but are not limited to, services events for access control, authentication, encryption, non-repudiation and public key infrastructure. Further examples of services events, such as collaboration services events include, but are not limited to, services events for social networking, virtual workgroups, instant messaging, surveys, polls, discussion boards and document sharing.

Such services, and their potential for corresponding number of generated events and amount of event data, can grow very rapidly. For example, it is estimated that, beginning in December of 2008, a very popular social networking service exceeded 130 million monthly active user mark, and shortly thereafter appeared to increase significantly at a rate of 600,000 or perhaps even 700,000 new users each day.

Furthermore, powered by recent advances in mobile communications technology, the variety of different ways of delivering services is increasing rapidly. In the past, people were constrained to consuming such services in their homes or offices. Today, people may wish to consume any of the foregoing services—at any time and in any place, as mobile communication services (potentially generating rapidly increasing numbers of events and amounts of event data).

Adequate processing headroom is needed to accommodate such increases in processing load. As a general matter, scalability indicates an ability either: to handle growing amounts of work in a graceful manner with adequate headroom; or to be readily enlarged, so as to increase total throughput under an increased load, when resources (typically hardware) are added. For example, a system whose performance improves after adding hardware, proportionally to the capacity added, is said to be a scalable system. However, if the design fails with increased load, despite increased resources, then it does not scale.

Accordingly, it should be understood that innovations are needed to handle real time, or near real time, processing of substantial and increasing volume of event data streams, in a scalable and efficient manner.

SUMMARY OF THE INVENTION

Broadly speaking, the present invention provides a scalable system and method for near real time, processing of a substantial volume of event data stream The invention may advantageously provide for scalable and efficient transformation of event data streams into complex event data. In one embodiment, the invention pertains to a near real time method and system for processing a substantial volume of event streams by aggregating data of the event streams in substantially real time. A concurrent throughput receiver can be coupled to an input of a processor for receiving the substantial volume of event streams and implementing substantially concurrent throughput of the substantial volume of event streams.

The invention can be implemented in numerous ways, including as a method, system, device, or apparatus (including computer readable medium). Several embodiments of the invention are discussed subsequently herein.

As a computer-implemented method for near real time application monitoring, one embodiment of the invention may aggregate information to a distributed cache from a plurality of entities, wherein the entities are structured in a nodal hierarchy, and summarize to a summary database the nodal information into summary level statistics for each of the nodes of the hierarchy.

As a computer readable medium, another embodiment of the invention may, for example, include at least computer program code stored thereon for aggregating the information to the distributed cache, and computer program code for summarizing the nodal information into summary level statistics, in summary database form.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 1A, 1B and 1C together are a simplified block diagram of one embodiment of the invention.

DETAILED DESCRIPTION OF THE INVENTION

Figure 1C:
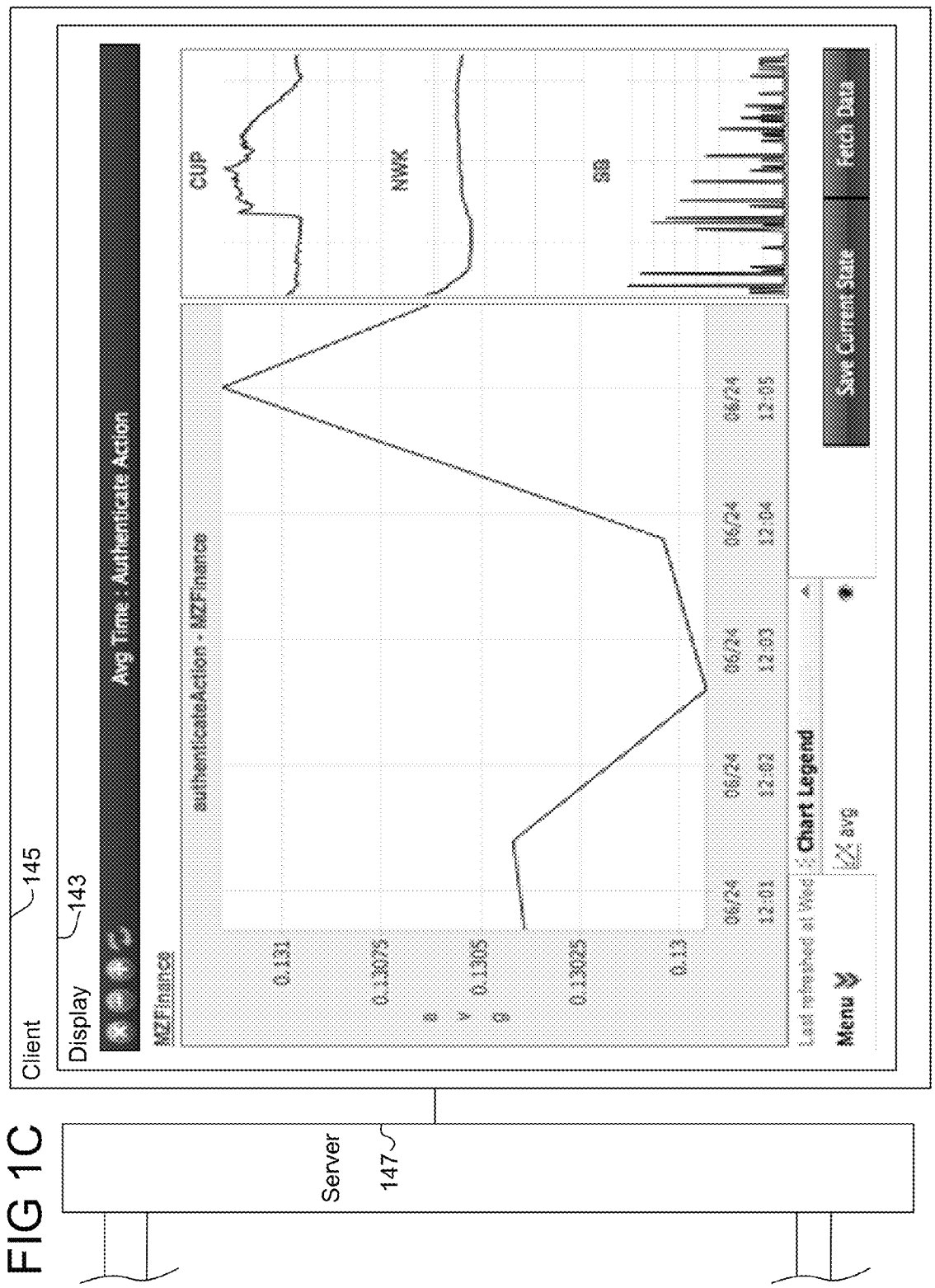

Broadly speaking, the present invention provides a scalable system and method for near real time, processing of a substantial volume of event data stream The invention may advantageously provide for scalable and efficient transformation of event data streams into complex event data. In one embodiment, the invention pertains to a near real time method and system for processing a substantial volume of event streams by aggregating data of the event streams in substantially real time.

A concurrent throughput receiver can be coupled to an input of a processor for receiving the substantial volume of event streams and implementing substantially concurrent throughput of the substantial volume of event streams. A near real time event stream processor should be understood as being substantially faster, in fair comparison, to traditional, non-real time, relational database management systems, fundamentally operating with high latency through rotating disk storage.

Although the invention may be provide benefits and advantages with respect to systems and methods for scalable, near real time, processing of substantial volumes of event data streams from sensors and events for application monitoring services, the invention is not limited to application monitoring services. Substantial volumes of other kinds of event data streams may benefit from scalable, near real time, processing using the invention, with respect to events and suitable sensors for various: e-commerce services, RFID services, financial services, healthcare services, security services, collaboration services, mobile communication services, as well as other computer implemented services that generate substantial volumes of event data streams.

In large scale implementations of such services, a substantial number of sensors may be supported, wherein the substantial number of sensors should be understood as being large, such as approximately five-hundred sensors or more, or approximately one-thousand sensors or more, or approximately five thousand sensors or more. Further, scalability and concurrency aspects may provide support for many, many more sensors such as approximately ten thousand sensors, approximately one-hundred-thousand sensors or more.

Similarly, in large scale implementations of such services, the concurrent throughput receiver may support a substantial volume of event data streams, which are generated by a substantial number of sensors. The substantially concurrent throughput of the receiver, and the substantial volume of event data streams should both be understood as corresponding to high message rates, such as substantially greater than approximately fifty-thousand messages per minute, or substantially greater than approximately one-hundred thousand messages per minute, or substantially greater than approximately two-hundred-and-fifty-thousand messages per minute. Further, the scalability and concurrency aspects may provide support for much larger implementations of such services, wherein the substantially concurrent throughput of the receiver, and the substantial volume of event data streams may both be substantially greater than approximately five-hundred thousand messages per minute, or one million or many more millions of messages per minute, or greater.

Embodiments of the invention are discussed below with reference to FIGS. 1-5. However, those skilled in the art will readily appreciate that the detailed description given herein with respect to these figures is for explanatory purposes as the invention extends beyond these limited embodiments.

FIGS. 1A, 1B and 1C together are a simplified block diagrams of one embodiment of the invention, embodied as a computer-implemented apparatus for processing of a substantial volume of event data streams. The event data streams may be generated by a substantial number of sensors for sensing events.

FIG. 1A shows a logical hierarchy organization of the substantial number of the sensors, according to one embodiment of the invention. Levels of the logical hierarchy organization of the sensors, which are particularly shown in FIG. 1A, beginning with a lowest hierarchical level of application Instances 101. This can be followed by a next hierarchical level of Host Machines 103; followed by a next hierarchical level of database Partitions; and followed by a next hierarchical level of Data Centers 105. This can be followed by the highest level of logical hierarchy organization of sensors, which is a level of a large distributed Application program (for example, a large e-commerce application, such as an iTunes™ online store). Accordingly, it should be understood from FIG. 1A that a plurality of logical nodal entities, such as the Sensors of FIG. 1A, are structured in a logical nodal hierarchy, wherein the nodal hierarchy may include application, data center, partition, host and instance.

Various operational advantages are provided by the hierarchy, and by running such a large distributed Application program using a plurality of geographically distributed Data Centers in network communication with each other. In one embodiment, a first one of the Data Centers may have a location (for example, Data Center A as shown in FIG. 1A, which may be located on the West coast of the United States, for example in Cupertino, Calif.), and another one of the Data Centers may be located geographically remote from the location of the first one of the Data Centers (for example, Data Center Z as shown in FIG. 1A, which may be located on the East coast of the United States, for example in Newark, N.J.). As will be discussed in greater detail subsequently herein, the invention may advantageously provide for near real time event stream processing across such distributed Application, across such geographically remote and distributed Data Center sites.

Furthermore, it should be understood that an application landscape may comprise multiple large distributed application programs, with each distributed Application running on multiple servers. For the sake of simplicity, just one of the Applications of the multiple Applications spanning distributed execution on the multiple Data Centers is shown in FIG. 1A. Although just one large distributed Application program and its application Instances will be specifically discussed in detailed teachings herein, one with ordinary skill in the art will understand the scope and teachings of the invention as extending to multiple distributed application programs and their respective numerous application instances.

As representatively illustrated in the block diagram of FIG. 1A, the large distributed Application runs as a large number of application Instances. In one embodiment, each sensor can be embodied as a respective executable Simple Network Management Protocol (SNMP) trap program statement. The SNMP trap program statements sense performance events of the application instances, and operate as sensors in reporting performance indicators of the application Instances as streams of performance event data. A respective one of the executable SNMP trap program statements of a respective one the sensors can be embedded into each application Instance 101 (as is representatively illustrated in the block diagram of FIG. 1A, using legends indicating "Instance/Sensor").

As shown in FIG. 1A, multiple application Instances run on each of a large number of multi-processing Host Machine computers 103, which are in networked communication with each other in computing clusters. Similarly, each of the clusters of Host Machine computers are in networked communication with each other within each Data Center, as well as between each Data Center.

As representatively illustrated in the block diagram of FIG. 1A, there are a plurality of logical groupings of the Host Machines, wherein each grouping of Host Machines can be organized for access to a respective Partition of a database for use by the distributed application. As shown in FIG. 1A, the Host Machines, as grouped by their respective database partitions, are housed in the plurality of Data Centers for running the distributed Application.

The large number of sensors imbedded in the large number Instances of the distributed application may be managed by distributed management software programs. Such a management framework for Sensors may be used. The Sensors shown in FIG. 1A report data of performance indicators, or Key Performance Indicators (KPIs), of the application Instances, as streams of performance event data.

Each of the SNMP Management Systems 107 are shown in FIG. 1A as receiving streams of performance event data from the SNMP trap statements of each of the application Instances. Event data can be read into a respective array list 109 of each of the SNMP Management Systems 107. The Management Systems 107 also receive Metadata describing the data of each performance event, which is read from Management Information Bases (MIBs) of the Management systems. The metadata for each performance event is packaged into Heartbeat data objects, to provide descriptive data such as application name (appname), data center, partition, host, instance name and timestamp for capture time of each performance event. Heartbeat objects are wrapper objects that contain the foregoing metadata along with sets of Event Bean messages containing the performance indicator data of the performance events, such as maximum KPIs, minimum KPIs, average KPIs and count KPIs. Illustrative textual descriptions of two examples of the Heartbeat wrapper objects (each originating from different data center locations) are provided in Appendix A1.

In one embodiment, object oriented software such as objects, containers, methods, classes, agents and Java bytecode can be employed for execution using Java Virtual Machines and related software implemented on each of the Host Machines, as well as the OpenMQ Java Message Service. Various software packages and software environments such as Java version 1.5, Perl version 5.8.8, Open MQ version 4.2, Oracle Coherence Cache version 3.3, and Oracle Database 10.3.03 with PL/SQL may be used.

One or more Heartbeat wrapper objects may be encapsulated in event messages, which may include calculated statistics, based on the performance indicators, such as average process time; average wait time; count of requests and may further each include a call to a respective Agent Java program. In one embodiment, a designated class Agent can be a main touch point for a distributed application program, to provide for publishing event stream data of key performance indicators of instances of the distributed application, which in turn provides for real time (or near real time) monitoring of the application.

The class Agent may contain a few Static methods through which the reference to the Agent may be acquired. When a call is made to a captureStat method, the information is collected into the in-memory arrayList. Each application thread may collect any number of events by giving each event a unique name (which will then be carried across in all the components, and will be visible to a User via a Client of a web portal Server's user interface).

In one embodiment, a Distributed Publisher may be employed for replicating the substantial volume of event streams. As shown in FIG. 1A, a plurality of publish threads 111 (which comprise the Distributed Publisher) replicates the substantial volume of event streams. Further, as shown in FIG. 1A, a publish-subscribe exchange 113 may be coupled with the Distributed Publisher. In one embodiment, the publish-subscribe exchange comprises a Message Oriented Middleware (MOM) publish-subscribe exchange 113. For example, in one embodiment the publish-subscribe exchange can be implemented in Java Message Service (JMS) technology as a Topic (e.g., JMS Topic 113).

In one embodiment, the publish-subscribe exchange 113 shown in FIG. 1A comprises a first networked cluster of publish-subscribe exchange host machines that have a location in Data Center A, and a second networked cluster of publish-subscribe exchange host machines that can be located geographically remote from the location of the first cluster of publish-subscribe exchange host machines in Data Center Z. The clusters of publish-subscribe host machines situated in the various Data Centers are in network communication with each other, so as to provide the JMS Topic spanning the Data Centers, as representatively illustrated in FIG. 1A by the JMS Topic 113 block drawn as over lapping the Data Center blocks. An example textual description of instructions for configuring the JMS Topic 113 in OpenMQ is provided in Appendix B1.

Messages may be enqueued into the JMS Topic, periodically, for example every minute (or any other desired predefined interval of time) by each application Instance. Data may be published into different topics for each logical group of applications.

There may be some benefit from using topics instead of queues at this point. Such use of topics may, in cases where there are multiple subscribers, can help to avoid delays caused by a malfunctioning or "bad" subscriber, which may otherwise adversely impact performance. The Distributed Publisher may tolerate non-availability of the JMS Topic, and stop trying to publish messages for fifteen minutes, and retry later. This may ensure that there is no impact to the online application due to a monitoring component outage.

The Distributed Publisher may be implemented on the host machines using object oriented programming and a publisher class. In turn the publisher class may be used by the Agent. There may be two primary responsibilities of the publisher class: calculate the min, max, average and count for each eventName based on raw data in the arrayList/concurrentQueue; and call a Channels.write( ) method to send the data to the appropriate channel. The publisher class may support JMS as well as file channel.

The publisher class may implement Runnable and be scheduled in a Timer for a selected publishing frequency (configured, for example in a stats.properties file in computer readable memory). It also creates messages to write to the channels. The channel class is the base class for all the different channels. The channels may be of kind JMSChannel or FileChannel. The channel's job is to implement the write method, and write the messages to the appropriate external outputs like JMSTopic, JMSQueue or a File. Additionally, a suitable alternative Distributed Publisher device or devices may be used.

The publish-subscribe exchange 113 can be coupled between the Distributed Publisher and a Concurrent Throughput Receiver 115 for receiving the substantial volume of event streams, and implementing substantially concurrent throughput of the substantial volume of event streams, as shown in FIG. 1B. In one embodiment, throughput of the receiver may be implemented in accordance with terms of a service level agreement, or specifications of a service-oriented architecture. One or more Java Virtual Machines (JVMs) executing appropriate software in a networked Cluster of Host multi-processor machines (Host Cluster 117 as shown in FIG. 1B) implements the Concurrent Throughput Receiver 115 as well as a Concurrent Adapter 119 and a Concurrent Aggregator 121, which are shown as functional blocks in the block diagram FIG. 1B. As will be discussed in greater detail subsequently herein, in one embodiment a near real time event stream processor comprises a Distributed Cache 123 of computer-readable memory in conjunction with the Concurrent Aggregator 121; and such real time event stream processor can be coupled with the Concurrent Receiver 115 as shown in FIG. 1B, for aggregating the data of the event streams into aggregated data of the events in substantially real time.

Various features of the Concurrent Receiver 115 have particular purposes in contributing to its substantially concurrent throughput. As shown in FIG. 1B, in one embodiment, the Concurrent Throughput Receiver 115 is multi-threaded, so as to provide a multi-threaded subscriber to the topic. The Concurrent Receiver 115 may comprise at least one pair of Message Oriented Middleware (MOM) queues 125, 127 of computer readable memory. An initial receiver queue 125 of the pair 125, 127 is sequentially arranged with a subsequent receiver queue 127 of the pair 125, 127 for sequentially receiving the substantial volume of event streams.

In one embodiment, the initial receiver queue 125 has a configuration that is substantially different than a corresponding configuration of the subsequent receiver queue 127. For example, in the embodiment shown in FIG. 1B, the initial receiver queue is configured as an initial bounded in-memory queue 125; and the subsequent receiver queue is configured as a JMS Bus 127. The various foregoing features of the Concurrent Throughput Receiver 115 may contribute to supporting high message rates. Example textual description of instructions for configuring the bounded in-memory queue 125 and the JMS Bus 127 of the Concurrent Throughput Receiver 115 in OpenMQ are provided in Appendices B2 and B3.

The Concurrent Throughput Receiver 115 may advantageously decouple receiving of data from the JMS Topic 113 from adapting and ingesting of data into the Distributed Cache 123. By introducing the JMS Bus 127 of the Concurrent Throughput Receiver 115, even if one or more adapter threads 129 temporarily cease functioning or "die", the Concurrent Throughput Receiver 115 may still keep receiving the messages and keep enqueueing them. Whenever any Concurrent Adapter 119 or adapter threads 129 revive, and begin functioning again, the Concurrent Adapter 119 or adapter threads 129 may start dequeueing messages again, and there will be no loss of data. The JMS Bus 127 also gives the freedom to run as many subscribers as possible, while also making sure each message is received by one (and only one) subscriber, thus making sure there is no duplication of data or efforts.

In order to circumvent a potential design problem, where the receiver thread that reads from the application JMS Topic could, in theory, also write the data out to a monitoring JMS Bus, adding undesirable lag or delay, the in-memory queue 125 is introduced. The receiver thread 131 (illustrated as a block in FIG. 1A) reads each of the messages from the Topic 113, and writes each of the messages to the in-memory queue. Then a pool of broker-threads 133 (illustrated as blocks in FIG. 1A) wait on the other side of the in-memory queue 125, to provide advantageous concurrent throughput of the substantial volume of event data streams, in enqueueing the messages onto the JMS Bus 127.

The broker-thread 133 pool size as well as the maximum message buffer size of the in-memory queue 125 may be configurable in OpenMQ, as described in Appendix B2. This sets the receiver thread 131 free to keep reading the messages from application JMS Topic, and distributes the task of unwrapping, re-wrapping and enqueueing the messages in between multiple threads 133 thus achieving a high level of scalability through parallelism. The various foregoing features of the Concurrent Throughput Receiver 115 may contribute to supporting high message rates. In one example, the Concurrent Throughput Receiver 115 may be implemented (with substantial additional headroom and low latency) to support substantially concurrent throughput of the substantial volume of event streams at a high combined volume of two-hundred-and-fifty-thousand messages per minute, from six thousand sensors, of six thousand application Instances of the distributed Application.

It should be understood that a topic in JMS is a destination where multiple publishers may publish the message and the message is delivered to all the subscribers. This may substantially complicate or forbid running multiple message consumers directly on the topic, so as to achieve parallelism. For example, launching multiple adapters that were connected directly to the topic may disadvantageously result in each adapter receiving the same message, which provide less of the desired scalability and performance benefits, and may be wasteful of resources.

The embodiment shown in FIG. 1B may advantageously avoid additional potential design problems, which may otherwise result from running hypothetical adapters—without concurrency. In such undesirable case, the hypothetical adapter lacking concurrency could otherwise have to read one message off the JMS Topic at a time, unwrap it, processes it and convert it to a desired Event Bean format for ingestion into the Distributed Cache, which could slow down the JMS Topic, since the volume of messages of the substantial volume of event data streams is high (and an overwhelming inefficient amount would otherwise have to be done at that single point of consuming messages serially).

Having the JMS Bus 127 as shown in FIG. 1B also allows for any of the subsequent components to be down for scheduled maintenance and upgrades without losing any monitoring data. The JMS Bus 127 may also be made durable, as required. Additionally, a suitable alternative Concurrent Throughput Receiver device may provide desirable and substantially concurrent throughput.

As shown in FIG. 1B, the Concurrent Adapter 119 can be coupled to an input of the event stream processor (comprising the Distributed Cache 123 in combination with the Concurrent Aggregator 121), for formatting the data of the substantial volume of event streams before being processed by the event stream processor. In particular, a plurality of adapter threads 129 are depicted as blocks in FIG. 1B, and are coupled with the event stream processor (comprising the Distributed Cache 123 in conjunction with the Concurrent Aggregator 121) for formatting the data of the event streams. The plurality of adapter threads 129 shown in FIG. 1B may advantageously provide for the concurrency of the Concurrent Adapter 119. Similarly, a suitable alternative Concurrent Adapter device may also be employed.

In one embodiment, the plurality of adapter threads 129 (WorkAdapter Threads) are embodied as a plurality of managed object adapter threads 129, for formatting the data of the event streams into managed objects. Applying concurrency principles, the adapter threads 129 may read messages off the JMS Bus, unwrap them, and process and convert them to the desired Event Bean format for ingestion into the Distributed Cache 123. To achieve a high level of parallelism, multiple (number configurable and changeable) adapter threads 129 may be employed inside the Concurrent Adapter 119, which may write to the Distributed Cache 123, as well as write out to files of an archival Data Warehouse 135, independent of each other and at the same time Further details of operation of one embodiment of the adapter threads 129 can be understood as follows. Each of the adapter threads 129 may be coupled to the monitoring JMS Bus for dequeueing respective messages. After validating message integrity, the enclosed Heartbeat object can get extracted, from which the metadata of the heartbeat appname, data center, partition, host, instance name and timestamp can be determined. Then the enclosed set of event statistics objects are iterated upon reading the stats for each eventName (these are the same event names, which were published from each Instance). One Event Bean (AppEventStatistics object) is created for each eventName (also called KPI or key performance indicator) that contains the statistics (avgTime, minTime, maxTime, count) along with the metadata (as above). Each Event Bean is then pushed out to both the Distributed Cache 123, as well as corresponding data to the file, which is consumed by Data Warehouse 135 input scripts (for example, Perl input scripts may be used with Oracle database software of the Data Warehouse). Appendix A2 provides a textual description of an example the Event Bean, which is formatted by the Concurrent Adapter 119 for ingestion into the Distributed Cache 123.

In one embodiment, the event stream processor comprises the Distributed Cache 123 of computer-readable memory, and the Concurrent Aggregator 121 coupled with the Distributed Cache 123 as shown in FIG. 1B. In one embodiment, the Distributed Cache 123 may be embodied as the Distributed Cache Cluster shown in FIG. 1B, using a networked cluster of multiprocessor Host machines running, for example, Oracle's Coherence Cache software (an example textual description of instructions for configuring the Distributed Cache 123 using Oracle's Coherence Cache is provided in Appendix B4). The Concurrent Aggregator 121 of the event stream processor includes instructions for aggregating the data of the event streams at levels of the logical hierarchy organization of the sensors, which were discussed in detail previously herein with respect to FIG. 1A.

As representatively illustrated by a layered hierarchy of blocks in the Distributed Cache Cluster 123 shown in FIG. 1B, in one embodiment, the data of the event streams may be hierarchically aggregated in the Distributed Cache 123 at the level of the application instances, the level of host machines; the level of database partitions; a level of data centers; and an application level. Accordingly, in one embodiment, an event stream processor is adapted for transforming the data streams of events into complex event data, comprising at least one of: host machine event data; database partition event data; data center event data; and application event data. In one embodiment, near real time processing of the event stream processor may be implemented in accordance with terms of a service level agreement, or specifications of a service oriented architecture. As shown in FIG. 1B, conventional database storage, in the form of the Data Warehouse 135, can be coupled with the event stream processor for archiving the aggregated data.

The Concurrent Aggregator 121 is a component, which is adapted for making logical summarizations on the received event data streams from each application Instance level. The embodiment shown in FIG. 1B may advantageously provide, in near real time, a current view of each application Instance, as well as a near real time holistic view at various levels of logical groupings. One embodiment may provide query responses in near real time, for the current average time taken for anAction in anApplication across all the instances (i.e., at Application level) or across all the instances in a Data Center (i.e., at Data Center level) or across all the instances in a database Partition, and so on. Accordingly, one embodiment may provide, the current performance statistics of a specific application Instance in near real time; and also may further provide in near real time such current performance statistics for the Host Machine that houses multiple such instances; and also may further provide in near real time such current performance statistics across the database partition that serves multiple hosts, and also may further provide in near real time such current performance statistics across the Data Center that houses multiple database partitions; and also may further provide in near real time such current performance statistics for the entire large distributed Application, and for the multiple distributed applications.

As briefly discussed previously herein with respect to FIG. 1A, the plurality of logical nodal entities, such as the Sensors of FIG. 1A, are structured in the logical nodal hierarchy, wherein the nodal hierarchy includes application, data center, partition, host and instance. As now discussed in further detail, the Instances along with their embedded Sensors (executable SNMP trap statements) may be understood as child nodes of the hosts, hosts as that of the partitions, partitions as that of the data centers and data centers as that of the application itself. Instructions of the Concurrent Aggregator 121 shown in FIG. 1B run every minute and aggregate current data in near real time, so as to summarize the nodal information into summary level statistics, in summary database form. The hierarchy of the nodal information is further illustrated by the layered hierarchy of blocks in the Distributed Cache Cluster 123 shown in FIG. 1B. Instructions of the Aggregator can also aggregate data for several minutes in the past from the current time (this may be configurable).

Instructions of the Concurrent Aggregator 121 shown in FIG. 1B can, in one embodiment, cause the Concurrent Aggregator 121 to perform the following steps: the instructions cause the Aggregator to process all of the appnames from the Distributed Cache and then record the current structure of the their hierarchy; the instructions cause the Aggregator to create records of the nodes and the nodal hierarchical structure for each logical grouping (Application, Data Center, Partition, Host) and for the application Instances, thus forming the entire tree structure of the hierarchy of the logical nodes in memory; and the instructions cause the Aggregator to read data (for a Key Performance Indicator, KPI, for the given timestamp, which is current or up to two minutes in the past) for all the instances of each Host Machine, and aggregates it to the Host level.

Instructions of the Concurrent Aggregator 121 then cause the Aggregator to perform the following additional steps: the instructions cause the Aggregator to create new Event beans for the host levels, wherein each new Event Bean includes the Aggregator's newly assigned host-kpi-timestamp combination; write the new Event Beans for the host levels into the Distributed Cache; and the instructions cause the statistics data for the host level to be written out also to a file that is consumed by scripts for time based roll-up and input into the Data Warehouse 135 for archival database storage. Once the level of all the logical Host nodes under the level of each of their logical database Partition nodes have gotten aggregated data assigned to them (for that kpi-timestamp), then the instructions cause the Aggregator to repeat similar processing steps for each of the logical Partition nodes, wherein aggregated data statistics are calculated for the level of the Partitions, and the aggregated data is pushed out to Distributed Cache (as new Event Beans) and corresponding data to database files of the Data Warehouse 135. This repeats in a similar manner for higher levels of Data Center level and then the Application level.

It should be specifically understood from the foregoing that aggregating a given node in accordance with the embodiment shown in FIG. 1B may provide for: reading data for the corresponding child nodes of the given node from the Distributed Cache (this involves network calls to the Distributed Cache Cluster); calculating aggregated statistics for the given node, and assigning nodes new kpi-timestamp combination; and writing the aggregated data back to the Distributed Cache for the given node (this again involves network calls to the Distributed Cache cluster); writing the data out to the database storage file of the Data Warehouse.

Doing all this aggregation for a very large number of logical nodes, for example ten thousand nodes, using only a single thread may not be adequately efficient, and may underutilize available processing resources and Distributed Cache resources. Accordingly, using only the single thread to perform the aggregation may fail to provide the desired near real time event stream processing, to an extent that significantly more than one minute of time may be consumed to process one minute's worth of the substantial volume of event data streams.

So that the Concurrent Aggregator 121 may satisfy performance requirements of a Service Level Agreement (SLA) (or specifications of a service oriented architecture), and also may make best use of the available processing and Distributed Cache 123 resources, the design of the Concurrent Aggregator 121 shown in FIG. 1B may perform aggregations with as much concurrency and parallelism as reasonably possible. Concurrency features of the Concurrent Aggregator 121 may be particularly advantageous for near real time processing of the substantial volume of Event Streams, and may be especially advantageous for aggregation for a very large number of logical nodes, for example ten thousand nodes.

However, before discussing further details of design implementation of the Concurrent Aggregator 121 of the embodiment shown in FIG. 1B, some additional discussion is directed to objects and methods stored in the Distributed Cache 123 and what they may provide. The objects stored in the Distributed Cache provide methods to: get statistics for a KPI, for example, eventName for a node (identified with its path, for example, anApplication, Data Center, Host etc.) for a specific minute in time, for example, 12:01; add statistics for a KPI for a node for a specific minute; get the names of all the Applications that are publishing data for processing by the event stream processor; get the names of all the children for a given node, for example, anApplication node may have two child nodes (Data Center A node and Data Center Z node), and further Data Center A node may have multiple child database partition nodes (2,3,4,5 etc.) and so on, until an individual Application instance child node is reached. All the above interfaces provided by objects and methods stored in the Distributed Cache 123 may be used advantageously by the Concurrent Aggregator 121 to achieve the previously discussed operations implemented by the Concurrent Aggregator.

Aggregation by the Concurrent Aggregator 121 may be performed in two passes: a first pass may recreate the entire hierarchical nodal tree structure in the Distributed Cache 123 so as to represent the logical hierarchy of nodes; and a second pass may read data for lower nodes from the cache, calculate aggregated statistics for the higher level nodes, and write them back to the Distributed Cache 123.

As shown in FIG. 1B, the Concurrent Aggregator 121 may be multi-threaded and have a configurable (and changeable) number of execution work threads 137. The plurality of execution work threads 137 of the Concurrent Aggregator 121 are representatively illustrated in the block diagram of FIG. 1B as a plurality of blocks within the Concurrent Aggregator block, and arranged adjacent to a Work Queue 139 block.

Working together in cooperation with the Work Queue 139 as shown in FIG. 1B, the execution work threads 137 of the Concurrent Aggregator 121 may: create independent fragments of the node hierarchy concurrently and in parallel; perform aggregation on two independent nodes concurrently and in parallel; and navigate any hierarchical interdependencies of the nodes.

Such independence of the plurality execution work threads 137 of the Concurrent Aggregator 121 may advantageously provide for achieving scalable parallelism in the Concurrent Aggregator 121, wherein nodal representation creation tasks and node aggregation tasks are identified, and handed them over to the pool of work threads 137 for parallel execution. For simplicity of design, execution, and efficiency, the work execution threads 137 of the Concurrent Aggregator 121 may not need to retain their own explicit records, or "know" what they are working on. Similarly the evolving data objects, which are shuffled in and out of the Distributed Cache 123, and which are the subject of incremental individual aggregation jobs or works likewise may not need to maintain explicit records or "know" what is working upon them, thus localizing the work of aggregation.

As briefly discussed previously herein, aggregation starts with the node-creation-works from the top of the logical nodal hierarchy. Aggregation may proceed until a leaf node is created from where node-aggregation-work starts getting enqueued in the Work Queue 139 of the Concurrent Aggregator 121. Only the seed-work i.e. node-creation-work for application nodes is enqueued by an initial main aggregation thread 141 (representatively illustrated in FIG. 1B by a single block, wherein such block is shown in FIG. 1B proximately arranged near a left side input of the Work Queue 139 block). Thereafter, all of the node creation-works of the execution work threads 137 for lower level nodes, and the aggregation work for all the nodes are generated by the execution work threads as a consequence of the execution of works themselves.

The Concurrent Aggregator 121 may run with a scheduler (e.g., Quartz scheduler) of the Java environment, which is configured to run aggregation every minute. Configuration for the Concurrent Aggregator 121 may be loaded from the Distributed Cache 123 once during the launch of the Aggregator. Right after launch and initialization, the process 141 can sleep until scheduler wakes it up on the top of the minute to perform aggregation for the 2nd minute in the past, i.e., at 12:03 the aggregator would try to aggregate data for 12:01 (as discussed previously).

The initial main aggregation thread 141, which may be spawned by the scheduler every minute, may get names of all the applications from an object initially stored in the Distributed Cache 123. It also may fix the target time (as two minutes in the past). The initial main thread 141 may then enqueue a respective node-creation-work for each application to the Work Queue 139. Each NodeCreationWork is dequeued from the Work Queue 139 by one of the execution work threads 137 in the Thread Pool that executes the work. Execution of the node creation work may result in creation of the Node representing the logical node in the hierarchy (app, datacenter, partition, host or instance) and its association with the parent node. As shown in FIG. 1B, the execution work threads 137 also enqueue new work into the Work Queue 139.

There may be two different kinds of works that may be enqueued as a result of the execution of NodeCreationWork. If the current node has some children (as per an object and method stored in the Distributed Cache 123 providing a .getChildren call for this node) then a new NodeCreationWork may be lined up in the Work Queue for each child of this node (and the process repeats for each node-creation-work from the previous step).

If the current node does not have any children (as per a cache.getchildren call) then it may be assumed to be a logical leaf node in the hierarchy, and a NodeAggregationWork for that node may be lined up in the Work Queue. The foregoing steps may be repeated until all the representational logical nodes have been created in the Distributed Cache 123. Both kinds of works (NodeCreation and NodeAggregation) may advantageously coexist in the Work Queue in any order. Each execution work thread 137 in the Thread Pool of the Concurrent Aggregator 121 reads a work object form the Work Queue 139 (as mentioned previously) which has all node-creation-work to begin with but the queue starts getting Node-AggregationWork as soon as a leaf node is created.

A NodeAggregationWork when executed does the following. It identifies if the corresponding node has children or not; for a leaf node (with no children) it is assumed that the statistics for each KPI for the corresponding Application for the given Time (12:01 in the example case) exists in the Distributed Cache and is read using cache.getstatistics method call thus populating the data in the node object. It is by design that NodeAggregationWork for a non-leaf node may be enqueued only when all the child-nodes have the relevant stats data—hence for the non-leaf node the data for each KPI is collected from each child node and maxTime, minTime, count and avgTime are calculated/determined from them. Once the data has been generated it is uploaded to the Distributed Cache (and written out to the files for database input scripts of the Data Warehouse to consume) for this logical-node for each KPI thus completing aggregation for the node. Once the data has been aggregated for the given node, a flag is set in its parent node indicating that the aggregation is completed for this given (child) node of the parent node, and indicating that the given (child) node has data needed for further aggregation of the parent node.

A NodeAggregationWork when executed also determines if aggregation is complete for all the other children nodes of the parent node or not. If yes, then new NodeAggregation-Work is created for the parent node, and is lined up as new work in the Work Queue 139 (and the foregoing process, as just discussed, repeats). After the aggregation has progressed back up to the Application nodes (which are the highest nodes in the representational nodal hierarchy) and aggregation is complete for each one of them, then a Root node, which is a phantom parent node for each Application node, can register that the aggregation is complete for all the Applications.

The initial Main thread 141 of the Concurrent Aggregator, which has been waiting for completion of aggregation to be registered at the Root node, then takes over control of the Concurrent Aggregator 121 and wraps up the aggregation with the following tasks. The initial Main Thread 141 of the Concurrent Aggregator 121 indicates whether the aggregation for that minute was successful or not; and rolls out the file in which the data was being captured to the inbox-directory of the database input scripts, for the Data Warehouse. The foregoing completes one aggregation cycle, after which the Concurrent Aggregator 121 remains dormant, unit until the next time it is woken up by the scheduler (at the top of the next minute) to initiate the next cycle of aggregation.

Alternative variations of the foregoing Concurrent Aggregator may produce some similar results with scheduling that is a little different. Instead of aggregating for the 2nd minute in the past and aggregating for only one minute in one cycle, the alternative variation aggregates data for times slots missed by the initial main aggregator thread (because of a down time, etc.). A Time Cache may save status of aggregation for a previous three hours. This alternative variation of the aggregator may then sweep through the Time Cache, so as to ascertain for which minutes the aggregation was unsuccessful, or was not performed at all, and aggregates data for those minutes. This version of the aggregator may be described as a Sweeping Aggregator. Similarly, within the scope of the invention, a suitable alternative Concurrent Aggregator device may be used, as will be appreciated by one with ordinary in the art to which the invention pertains.

FIG. 1C shows a Display 143 coupled with a first Client 145 machine, for displaying the aggregated data of the events in near real time. As shown in FIG. 1C, a first Server machine 147 may be network coupled to the Distributed Cache of the event stream processor, which may be operatively coupled to the Display 143 through networking of the Server 147 with the first Client 145. The Display 143 displays graphical event visualization of the near real time aggregated data. In one particular embodiment, the first Server 147 may be operatively coupled to the Display 143 for displaying near real time graphical event visualization of the aggregated data at the level of at the least one of: the application instances; the host machines; the database partitions; the data centers; and the application. The Display 143 of the near real time graphical event visualization may be viewed by a first User (for example, a systems manager), to inform the User in a timely manner. In such case the User may be empowered to make timely or critical decisions, based on display of the near real time aggregated data.

It should be understood that for the sake of simplicity, only the first one of the Servers, Clients and Displays are shown in FIG. 1C, and only the first one of the Servers, Clients and Displays are specifically discussed in detail herein with respect to the teachings of the invention. However, the invention is not limited to the first one of the Servers, Clients and Displays which are shown explicitly in FIG. 1C, and specifically discussed in detail herein (or to the first User discussed herein). Accordingly, it should be understood that multiple networked Servers, Clients and Displays may be employed by multiple Users, and the teachings of the invention may be applied, with beneficial results, especially when such multiple members may be located geographically remote from one another.

The first Client 145 shown in FIG. 1C may provide for a first query of the aggregated data by the first User. The first Server 147 may be coupled with the Distributed Cache of the event stream processor and with the first Client 145, for serving the aggregated data to the first Client 145 in response to the query from the Client. For example, a User may have the Client 145 query the Server 147 for near real time aggregated data at various levels of interest to the User. For example, if the User is interested in monitoring and comparing current, near real time performance indicators of one large, distributed Application, relative to another large, distributed Application; then through the Client the User may query the Server 147 for the Application level aggregated data, and the Server 147 may serve the application level aggregated data in response to such query from the Client 145.

Similarly, as another example, the User may be interested in monitoring and comparing currently, and in near real time, performance indicators of the Application running on different Data Centers. The invention may be particularly advantageous and convenient for the user, when the Data Centers are geographically remote from one another, in some cases by very large distances. As mentioned previously herein, the first one of the Data Centers, for example, Data Center A may be located on the West coast of the United States (for example in Cupertino, Calif.), and another one of the Data Centers may be located on the East coast of the United States, geographically remote from the location of the first one of the Data Centers by a very large continental distance (for example, Data Center Z may be located in Newark, N.J.). In such case, through the Client, the user may query the Server for the Data Center level aggregated data, and the Server may serve the Data Center level aggregated data in response to such query from the Client.

FIG. 1C shows the display of graphical event visualization of the near real time aggregated data, which may be processed in near real time by the Event Stream Processor. For the example screen shot shown in the block diagram of FIG. 1C, low latency processing may consume substantially less than one minute to aggregate to the highest "Application" level one minute's worth of the substantial volume of event data streams from the substantial number of sensors (a combined volume of two-hundred-and-fifty-thousand messages per minute from six thousand sensors of six thousand application Instances of the distributed Application, in this example). Accordingly, for the exemplary block diagram of FIG. 1C, the Event Stream Processor (and the Concurrent Aggregator) may provide low latency and the desired real time (or near real time) event stream processing and "Application" level aggregation, to an extent that significantly less than one minute of time may be consumed, for processing for one minute's worth of the substantial volume of event data streams.

The term near real time may be understood as a degree of responsiveness that is sufficiently immediate relative to current events, or as sufficiently low latency or as a capability to keep-up with current events in a reasonably meaningful way relative to such events. One embodiment may, every minute, aggregate the current event data in near real time, so as to provide the display visualization of the aggregated current event data (aggregated at the highest "Application" level as shown in the screen shot of FIG. 1C), while consuming substantially less than one minute for such aggregation. In addition to the most current minute's aggregated "Application" level data as shown in the screen shot of FIG. 1C, Application level aggregated historical data for previous minutes is also displayed, for a total of five minutes. Also shown in the screen shot of FIG. 1C are smaller event visualization graphs of lower levels of current and historical aggregated data corresponding to Data Center aggregation levels, such as for the Cupertino (CUP) and Newark (NWK) Data Center aggregation levels.

Similarly, as yet another example, the user may be interested in monitoring and comparing currently, and in near real time, performance indicators of the Application running on Host Machines grouped for services from various different database Partitions. Such database Partitions may be within the same Data Center, or they may be geographically remote from one another by very large distance (in Data Centers that are geographically remote from one another, even by very large distances). In such case, through the Client, the user may query the Server for the Data Partition level aggregated data, and the Server may serve the Partition level aggregated data in response to such query from the Client. Similar to the foregoing examples, Host Machines or Instances of the application may be within the same Data Center, or they may be geographically remote from one another, even by very large distances. Similar to the foregoing examples, in such case, through the Client, the user may query the Server for each of the Host Machine level aggregated data or the application Instance level aggregated data, and the Server may serve the respective Host Machine level or application Instance level aggregated data in response to each such query from the Client.

The first Server 147 machine shown in FIG. 1C can also be network coupled with the archival database storage of the Data Warehouse, for providing time-based roll-up of the archived historical aggregated data. Accordingly, one embodiment may provide for the User initiating visualization with a query at a higher (aggregate) level, and drill down to detailed levels (and past time durations) using follow-up queries, as required. Benefits of fine granularity of data from each application Instance level should be appreciated as providing for near real time monitoring and understanding trends originating in the recent past (or earlier). However, associated burdens should also be appreciated, as volumes of fine granularity data to be managed increase rapidly ("explode"), especially in cases where archives of the data may be maintained for a long period of time.

Accordingly, a basic assumption for the time-based rollup is that the most recent, most granular information may be needed for a fairly short time. For example, current minute data for all application Instances and higher levels of the aggregated data may be retained in the Distributed Cache for a predetermined time period (using, for example, serialization of the stored data objects). For example, relatively current data may be retained in the Distributed Cache for a selected time period of two hundred minutes. However, when Users want information for older time slots, it may not be desired at the same fine granularity as current information.

Furthermore such advantageous use of the Distributed Cache may help to avoid significant and undesirable trouble and expense. If the Distributed Cache were not employed, and if any attempts were made to employ sole and exclusive storage of the data in a traditional Relational Database Management System (RMDBS) fundamentally operating with high latency through rotating disk storage, there may be such undesirable consequences when attempting to insert/delete such huge volumes of data into the RDBMS.

In light of the foregoing reasoning, one embodiment may retain the following data granularities, in the following: one minute current data of each application instance may be retained for two hundred minutes in the Distributed Cache; five minute data for each application Instance may be retained for twenty-four hours in the archival database of the Data Warehouse; fifteen minute data for the Host Machine level and higher aggregated levels may be retained for one week in the Data Warehouse; hourly data for the Partition level and higher aggregated levels may be retained for two years in the Data Warehouse.

In one embodiment, PERL scripts may be employed to roll-up the data received 1 minute to 5 minute from the Adapter and Aggregator for archival database storage in the Data Warehouse. To do this, the PERL scripts may use similar formulas for each statistic, as may be used for current discussed previously and stored in the Distributed cache, so that to calculate statistics for the min. of min., max. of max., avg. of avg. (weighted, and based on number of time-slots already averaged), and sum-up the counts of the various Key Performance Indicators (KPIs). In one embodiment, five minute data or higher may be loaded to the archival database storage of the Data Warehouse using software such as SQL Loader software.

Figure 2A:
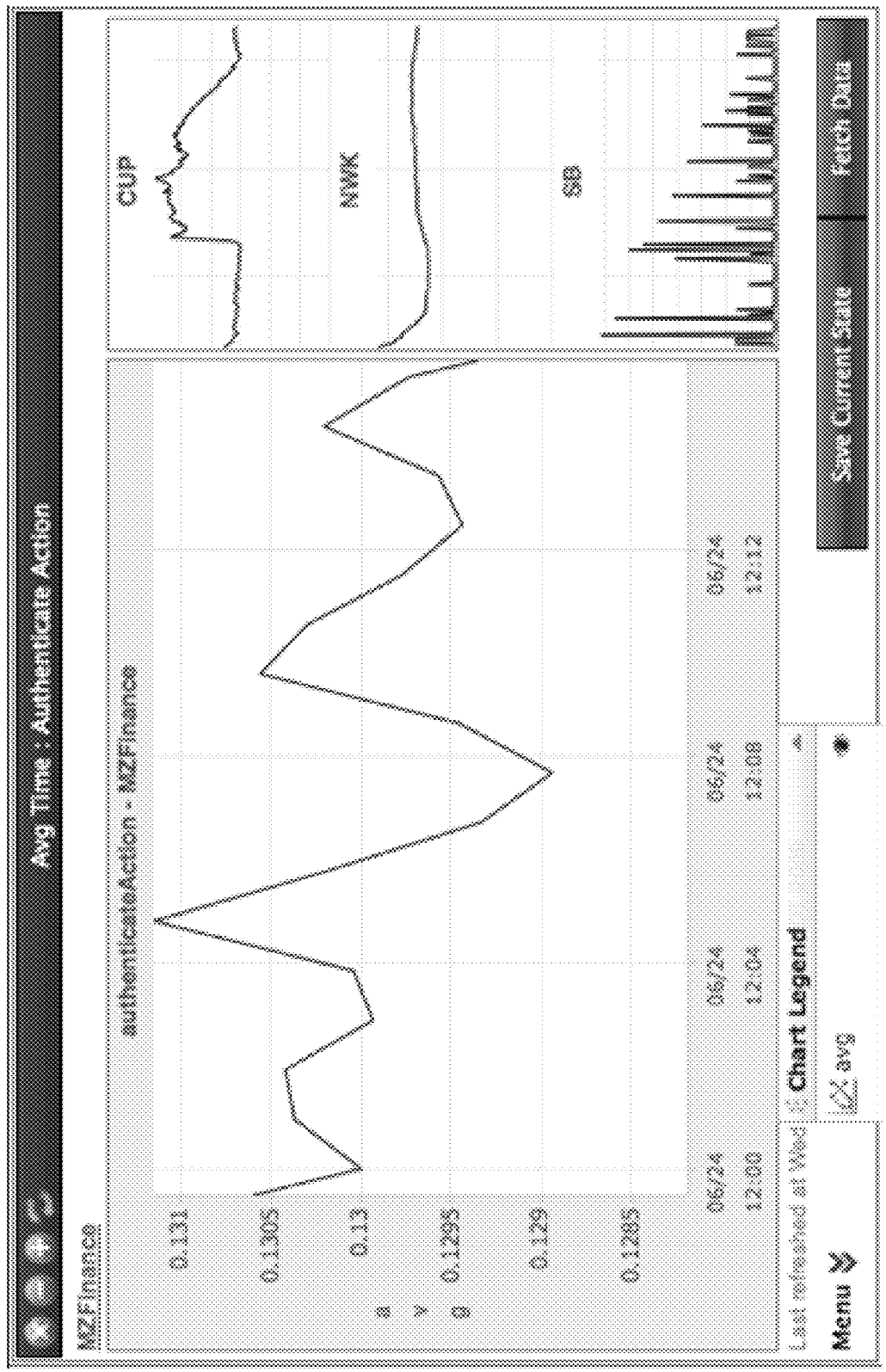
FIGS. 2A-2D are additional example graphical event visualization displays, which may be provided by the invention.

FIGS. 2A-2D are additional exemplary graphical event visualization displays, which may be provided according to additional embodiments. Similar to what was already discussed previously herein with respect to the screen shot shown FIG. 1C, the screen shot of FIG. 2A shows the most current minute's aggregated "Application" level data. However, whereas FIG. 1C shows Application level aggregated historical data for previous minutes for a total of five minutes, FIG. 2A shows Application level aggregated historical data for previous minutes for a total of fifteen minutes.

Figure 2B:
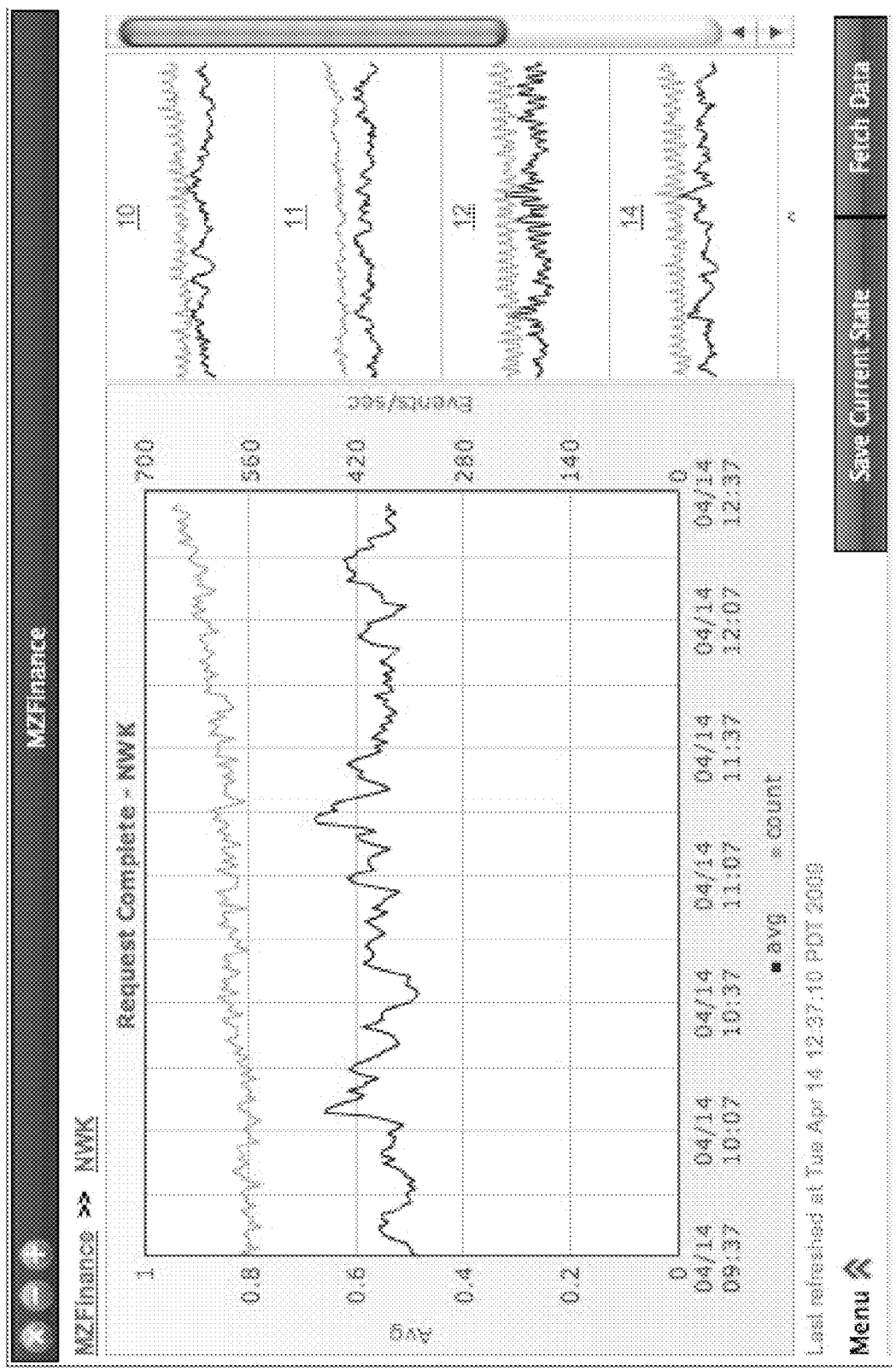

In the screen shot of FIG. 2B, two traces corresponding to two KPI's are shown on extended time scales. In addition to current aggregated "Data Center" level data for Network (NWK) Data Center as shown, historical Data Center level aggregated data is also displayed. Also shown in the screen shot of FIG. 2B are smaller event visualization graphs of lower levels of current and historical aggregated data corresponding to numbered data base Partitions.

Figure 2C:
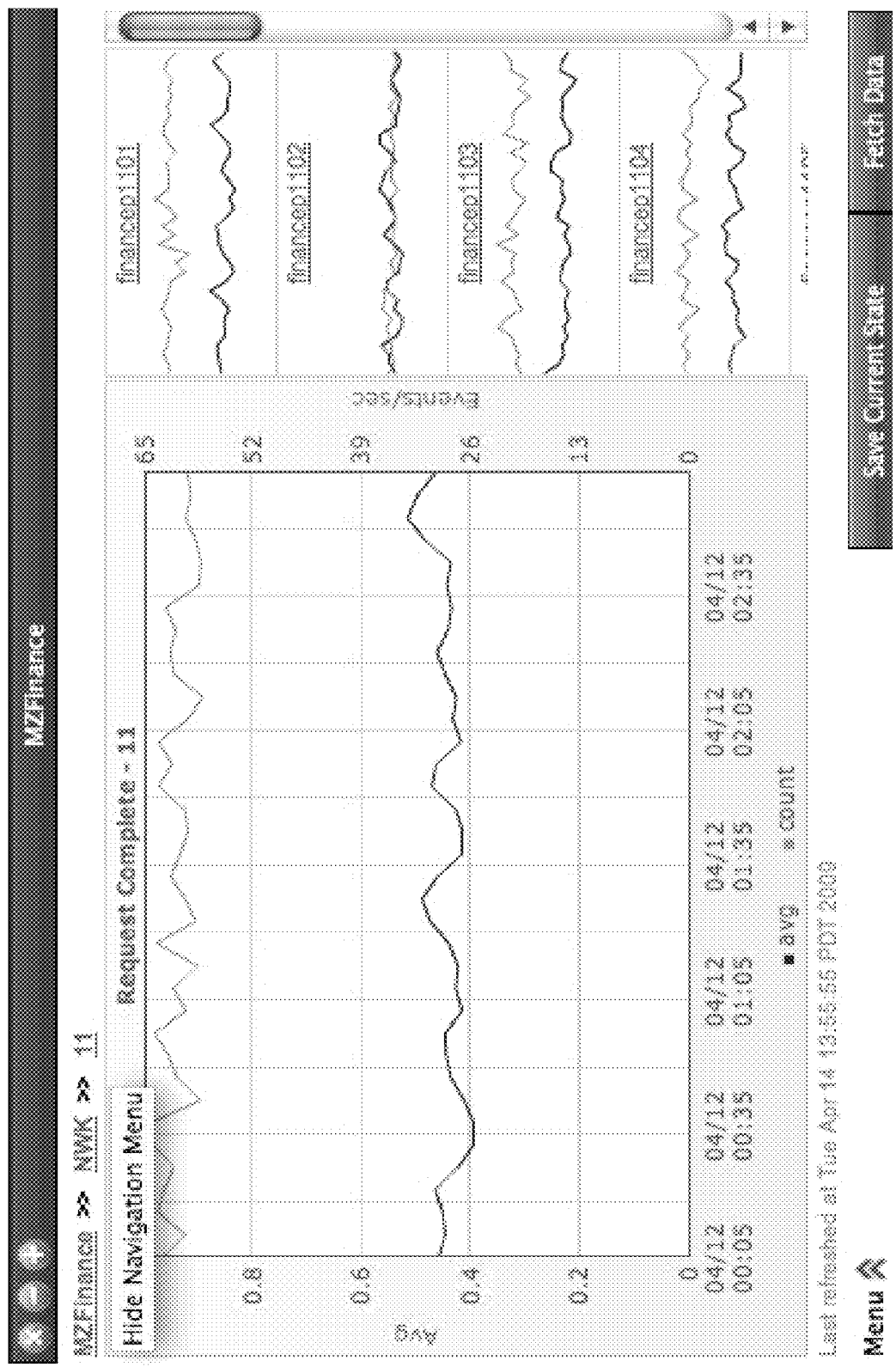

In the screen shot of FIG. 2C, in addition to current aggregated "Partition" level data as shown, historical Partition level aggregated data is also displayed. Also shown in the screen shot of FIG. 2C are smaller event visualization graphs of lower levels of current and historical aggregated data corresponding to specific Host Machines.

Figure 2D:
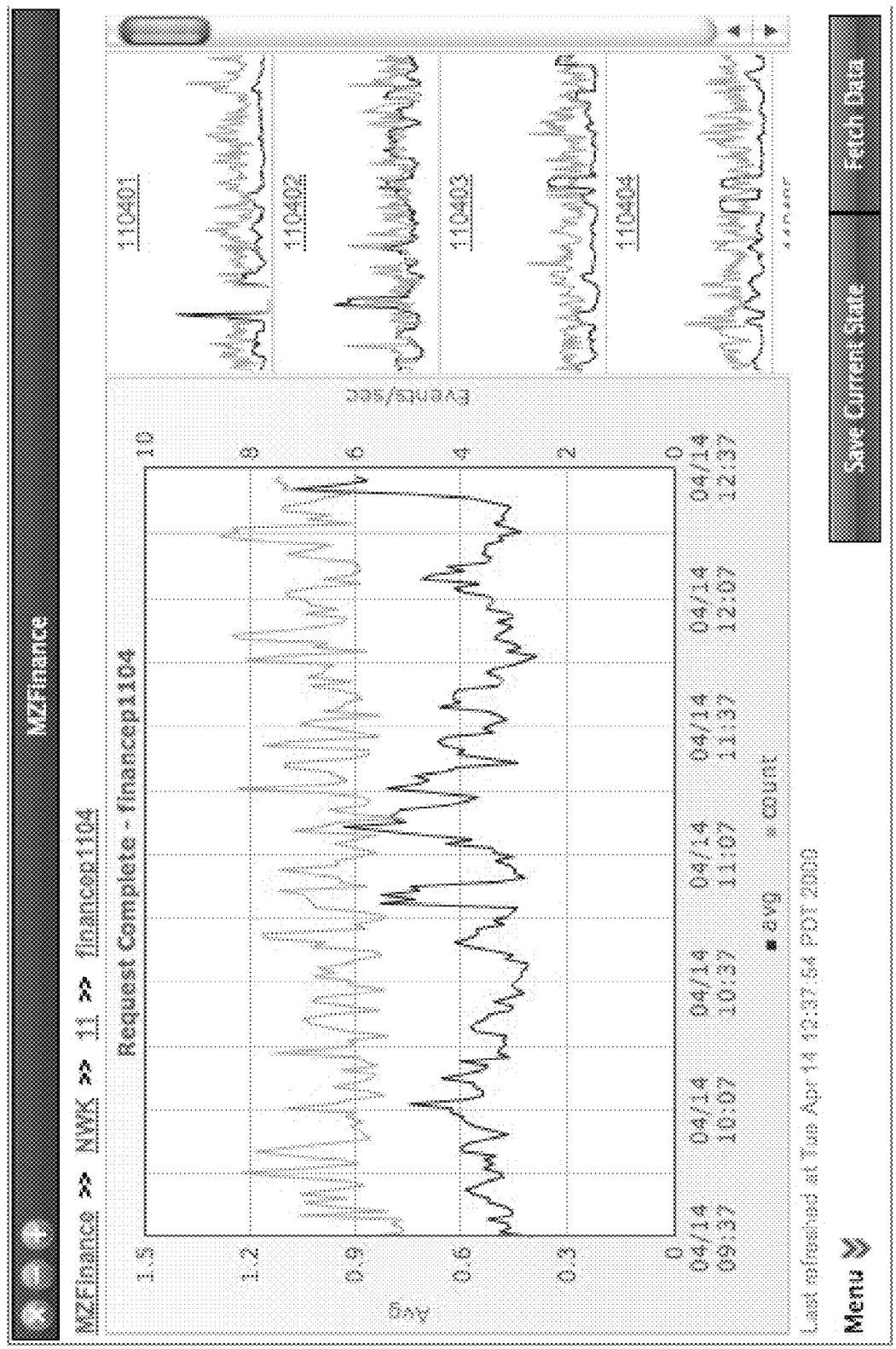

In the screen shot of FIG. 2D, in addition to current aggregated "Host Machine" level data as shown, historical Host Machine level aggregated data is also displayed. Also shown in the screen shot of FIG. 2D are smaller event visualization graphs of lower levels of current and historical aggregated data corresponding to specific application Instances.

Figure 3:
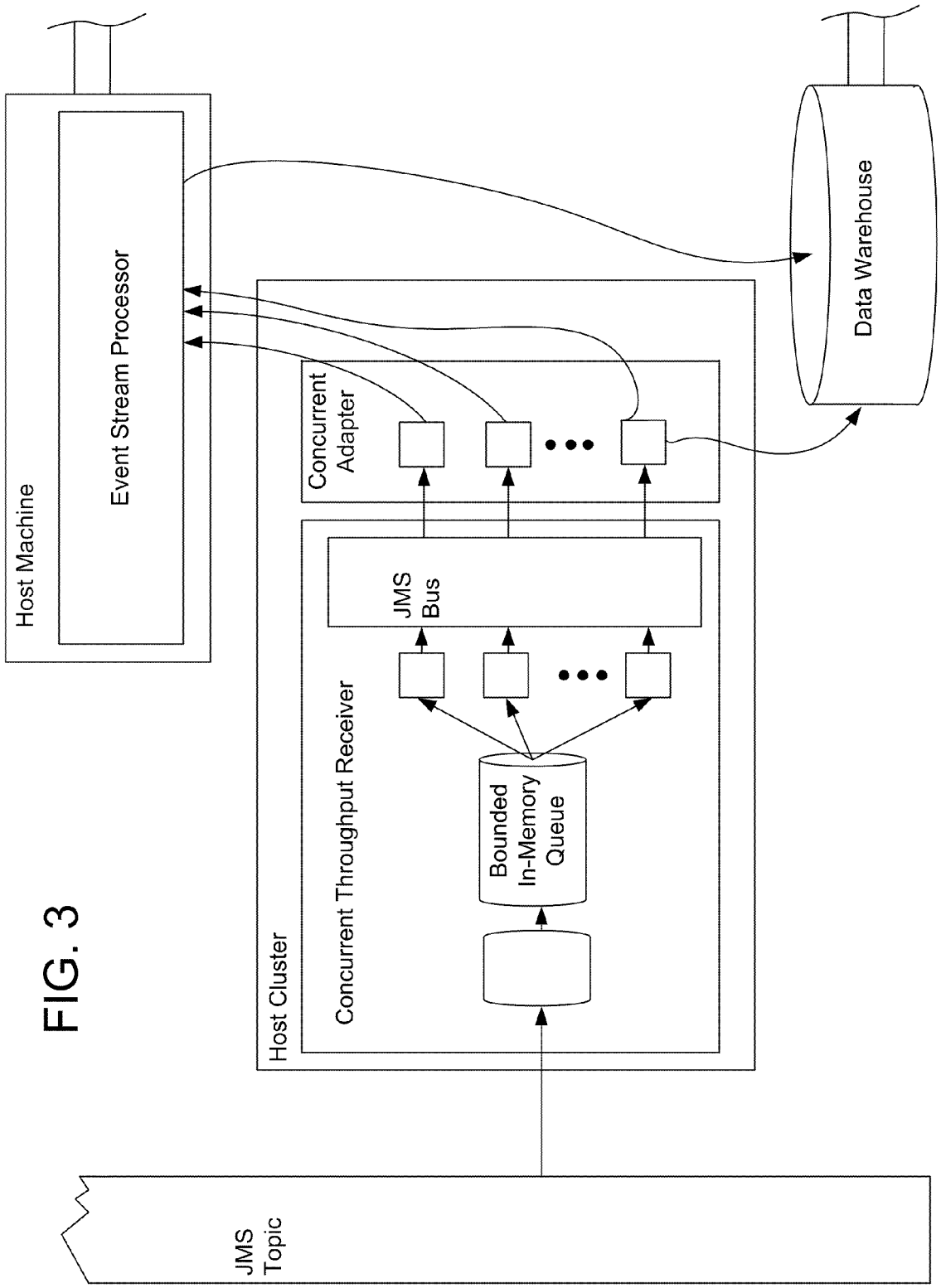
FIG. 3 is a block diagram showing an additional embodiment of the invention

FIG. 3 is a block diagram showing an additional embodiment, which may be similar in many ways to the embodiment already discussed in detail previously, herein and illustrated in the block diagram of FIGS. 1A, 1B and 1C. For the sake of simplicity, FIG. 3 does not explicitly show those features of the additional embodiment, which may be similar to corresponding features already shown and discussed with respect to FIGS. 1A and 1C. Further, for the sake of simplicity, it should be understood that what is shown of the additional embodiment in FIG. 3 is generally similar to what has already been shown and discussed with respect to FIG. 1B, and that previous discussions herein, which were directed to those features of FIG. 1B, already fully explain similar features of the additional embodiment, which may be shown in FIG. 3.

Notwithstanding the foregoing, visual comparison of FIG. 3 to FIG. 1B shows that the additional embodiment of FIG. 3 depicts a more general and broader Event Stream Processor in a Host Machine, in place of the more specifically described event stream processor of FIG. 1B, which comprises the Concurrent Aggregator coupled with the Distributed Cache shown in FIG. 1B.

Accordingly it should be understood from the additional embodiment of that various Event Stream Processors may be employed with beneficial results. For example, Rules Based Engines such as the well known Java Expert System Shell (JESS) software licensable from Sandia Labs (for example version 7.1) may be used with the aggregation event stream processing already discussed, so as to provide additional, even more complex event stream processing and automated business decision making. An example textual description of instructions for configuring JESS for the Event Stream Processor is provided in Appendix B5. As discussed in further detail in the examples of Appendix B6, JESS may be configured to alert System Administrators by automatically generated e-mail messages: if Aggregator memory consumption goes beyond 15% for a datacenter; or if Coherence memory consumption exceeds 70% of what is available; or if average System CPU load for a component designated as Database-Machine goes beyond a predetermined threshold in a minute.

Similarly, an Event Stream Processing Engine software application may be employed as the Event Stream Processor on the Host Machine shown in FIG. 3. Further, a query configurable state machine may be employed as the Event Stream Processor of the additional embodiment shown in FIG. 3. For example, a query tree of a User's query may be converted into a non-deterministic finite state automaton, from which a deterministic finite automaton of the query configurable state machine may then computed and implemented). Moreover, a suitable alternative Event Stream Processor device may be used.

Figure 4A:
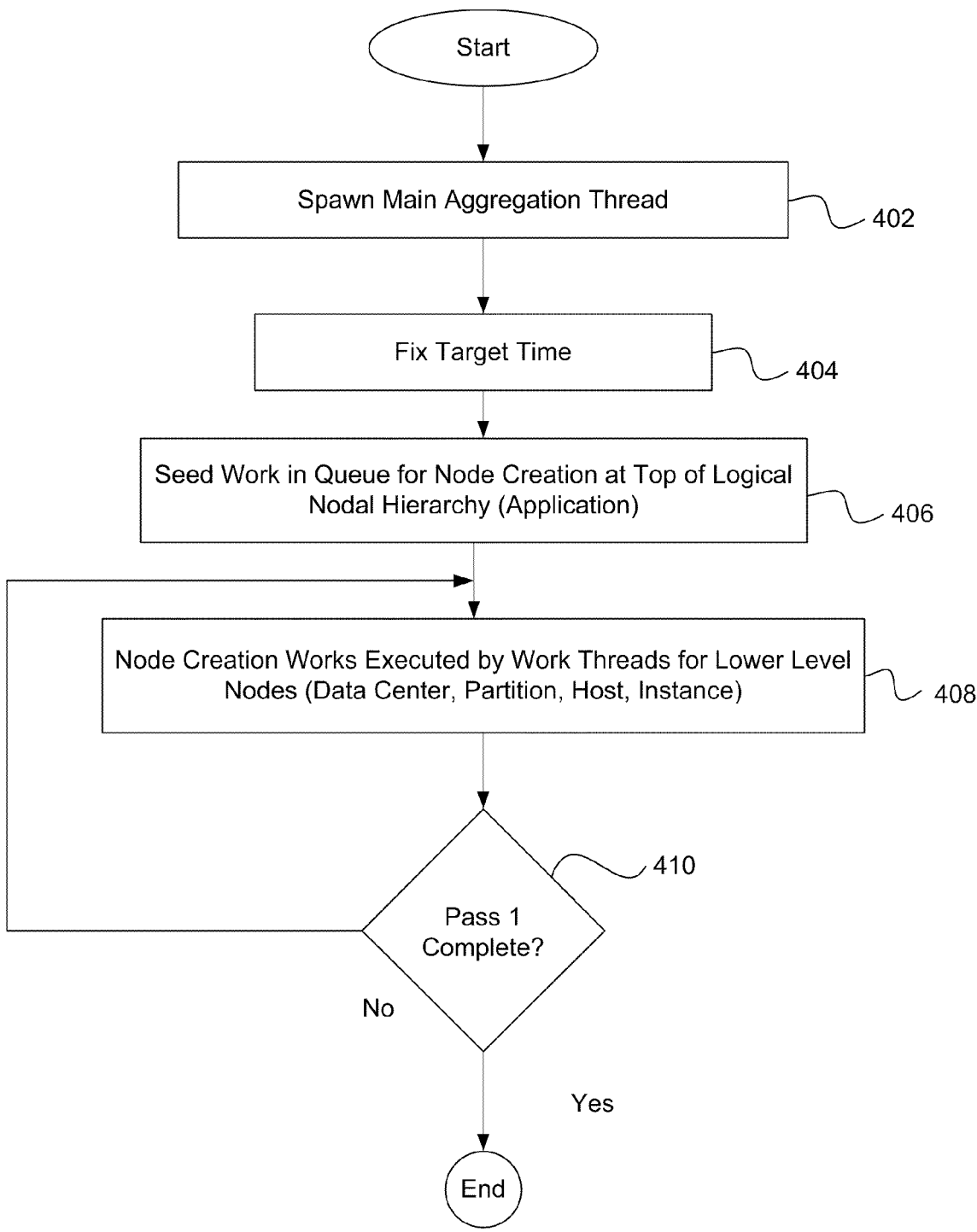
FIGS. 4A and 4B show flowcharts of a computer-implemented method of the invention.
Figure 4B:
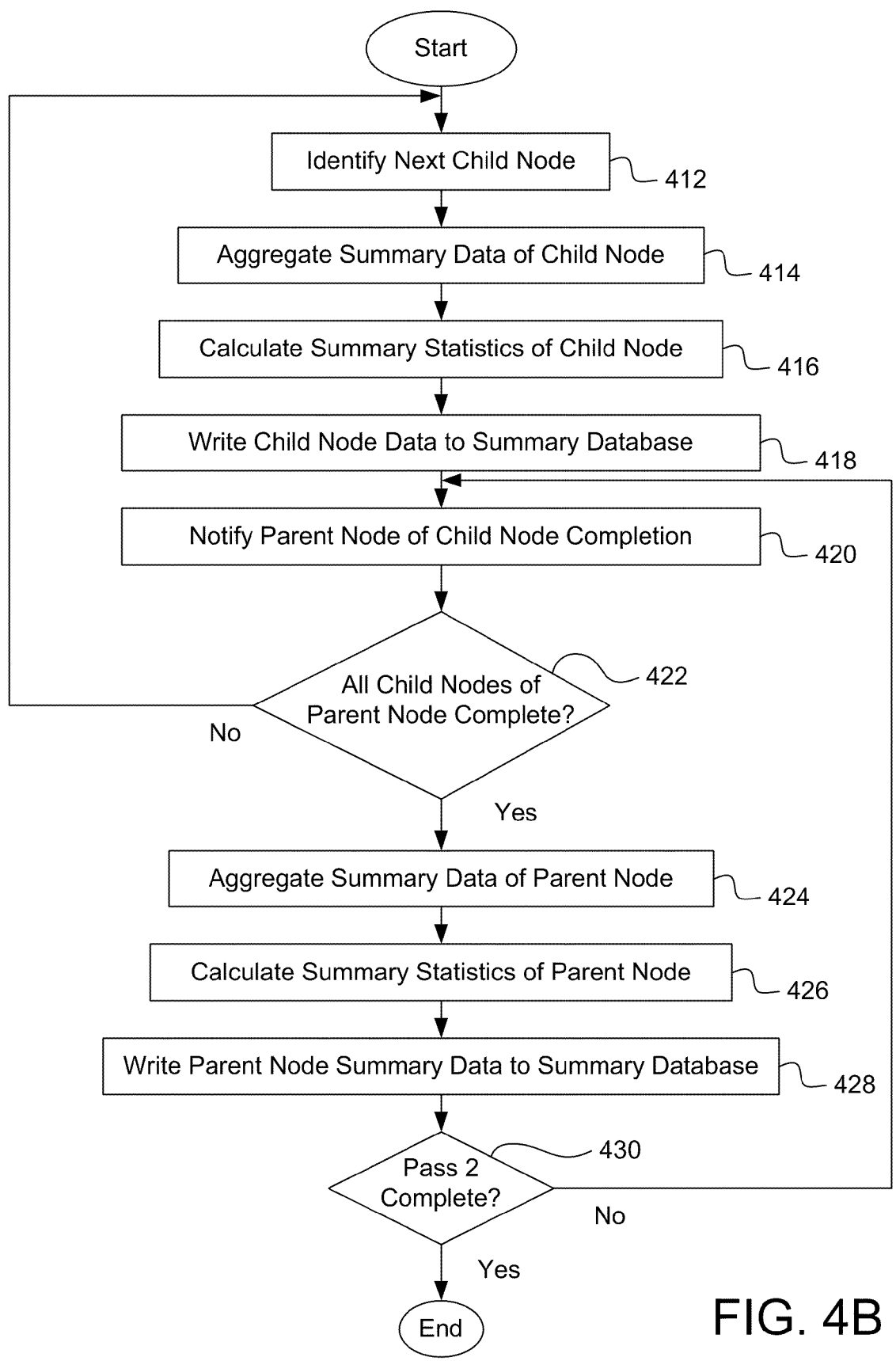

FIGS. 4A and 4B show flowcharts of a computer-implemented method according to one embodiment, for the real time or near real time application monitoring, as discussed previously herein. The flowcharts of FIGS. 4A and 4B further illustrate operations of one embodiment for aggregating information to a distributed cache from the plurality of entities, wherein the entities are structured in the nodal hierarchy, and summarizing to the summary database the nodal information into the summary level statistics for each of the nodes of the hierarchy. As illustrated in the flowchart of FIGS. 4A and 4B, the nodal hierarchy includes application, data center, partition, host and instance.

The method of the first pass of aggregation (pass 1-node creation) is started in FIG. 4A every minute by a scheduler (e.g., Quartz scheduler). The scheduler spawns 402 the initial main aggregation thread, which fixes 404 a target time and seeds 406 work in the Work Queue for node creation at the top of the logical nodal hierarchy, which is the Application level. The Thread Pool of execution work threads of the Concurrent Aggregator dequeue work from the Work Queue, and the node creation works are executed 408 by work threads for lower level nodes (Data Center, database Partition, Host Machine and Instance) while navigating any interdependencies of the nodes. Unless the execution work thread recognizes its newly created node as a leaf node, the execution work thread enqueues new node creation work for lower level nodes of its newly created node into the Work Queue, and then goes back to Work Queue to dequeue more work.

While any node creation work remains in the Work Queue, the first pass of aggregation (Pass 1 node creation) is not complete, and in such negative case of block 410 of the flowchart of FIG. 4A, node creation works as shown in block 408 continue to be executed by the work threads. However, the Work Queue is emptied of any node creation work as the last node is created by one of the work threads. At such time, all of the representational logical nodes have been created in the Distributed Cache by the work threads, the first pass of aggregation (Pass 1 node creation) is complete. In such affirmative case of block 410 of the flow chart of FIG. 4A, the method of the first pass of aggregation ends.

Methods of the second pass of aggregation (pass 2-node aggregation) are started as illustrated in the flowchart of FIG. 4B, whenever leaf nodes are created in the first pass of aggregation, pass 1-node creation (the flowchart of FIG. 4A). Such leaf node is identified 412 as the next child node and enqueued into the Work Queue. The execution work threads continue dequeueing work, including aggregation work, from the Work Queue. The dequeued work is executed by the work threads to aggregate 414 summary data of the child node, calculate 416 summary statistics of the child node, and write child node data to the summary database (to both the Distributed Cache and the Data Warehouse). The work threads set flags of the parent node to notify 420 the parent node as aggregation/stats of the child node is completed. As shown in decision block 422, the work thread then checks flags of the parent node, so as to determine whether aggregation/stats of all child nodes of the parent node are complete. In the negative case, the work thread enqueues new aggregation work in the Work Queue for the next child node of the parent node, and such identification 412 of the next child node is repeated by another execution work thread, as it dequeues the new aggregation work from the Work Queue. In the affirmative case, the work thread enqueues new aggregation work for the parent node into the Work Queue.

Another work thread dequeues the new aggregation work for the parent node, aggregates 424 summary data of the parent node, calculates 426 the summary statistics of the parent node, and writes 428 parent node summary data to the summary database to both the Distributed Cache and the Data Warehouse).

The second pass of aggregation (Pass 2 node aggregation) is not complete while there is still any aggregation work in the Work Queue, and while there is still aggregation work in the Work Queue the work threads continue executing the aggregation work. Further, the second pass of aggregation (Pass 2 aggregation) is not complete if any parent node itself still has a higher parent node (if the parent node is a child relative to the higher parent node). Accordingly, if Pass 2 is not complete, as shown in decision block 430, the higher parent of the parent node is notified 420 by the work thread setting the appropriate flag that aggregation/stats of the parent node (child of the higher parent node) is complete. However if the Work Queue is emptied of aggregation work and such parent node itself has no higher parent, then Pass 2 node aggregation is complete. The Root node, which is the phantom parent node for each Application node, registers that the aggregation is complete for all the Applications and the aggregation method illustrated in FIG. 4B ends.

The invention may also be embodied in a computer readable medium, including at least computer program code stored thereon for real time, or near real time, application monitoring. Accordingly, in one embodiment the computer readable medium comprises computer program code for aggregating information to a distributed cache from a plurality of entities, wherein the entities are structured in a nodal hierarchy, and computer program code for summarizing to a summary database the nodal information into summary level statistics for each of the nodes of the hierarchy.

Figure 5:
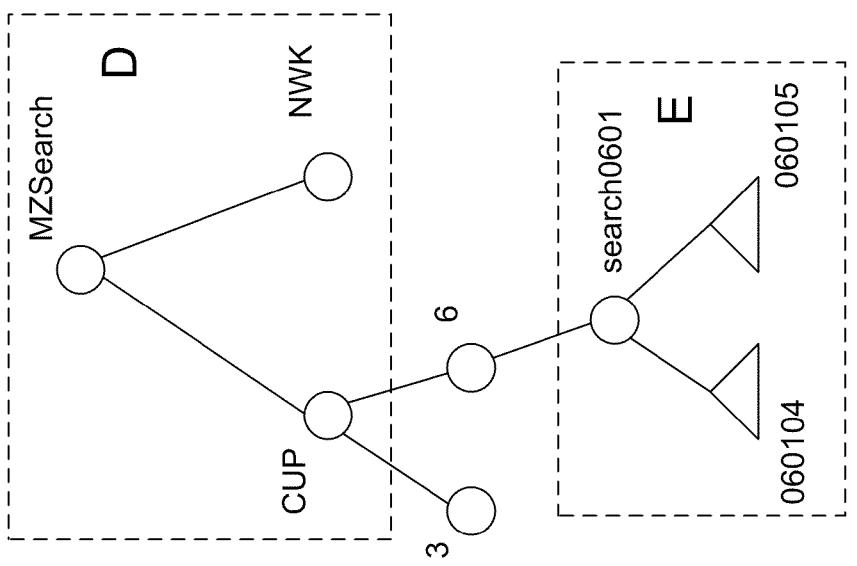
FIG. 5 is a representational diagram of logical nodal fragments, illustrating operation of the invention.
Figure 5:
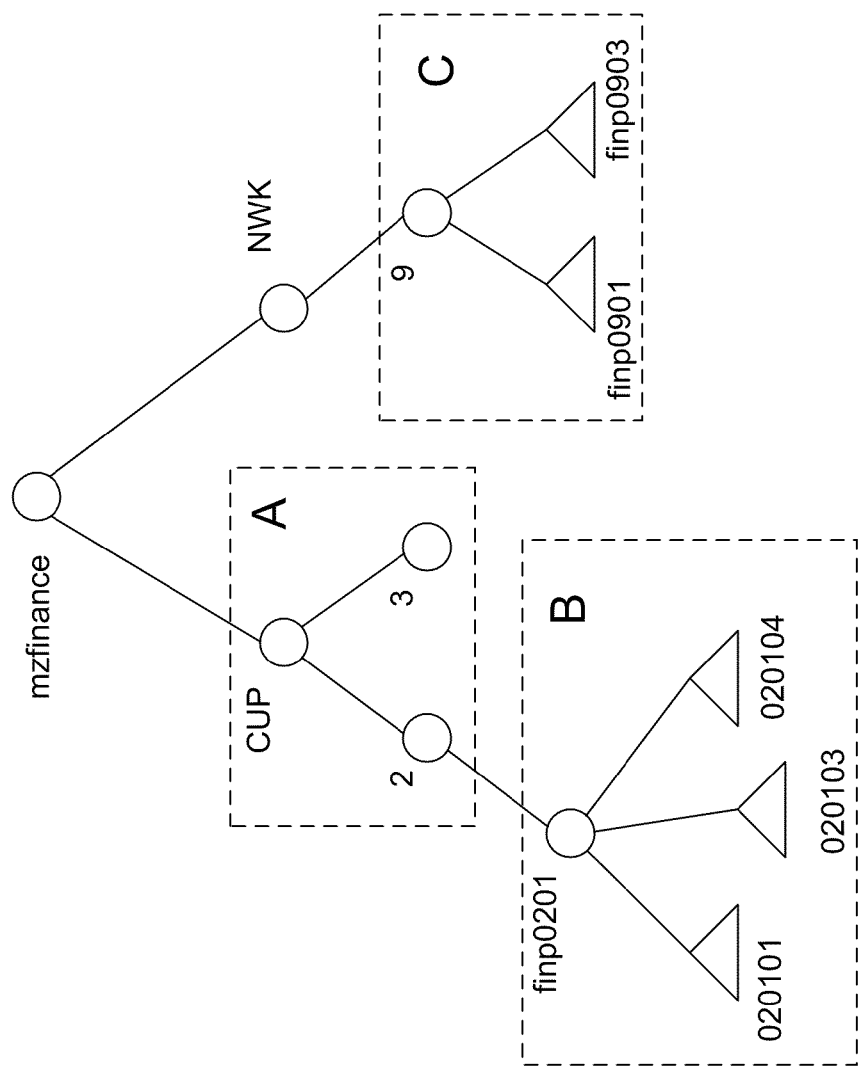

FIG. 5 is a simplified representational diagram of logical nodal fragments, further illustrating operation in navigation of nodal dependencies, in the first pass of aggregation (Pass 1 node creation) and in the second pass of aggregation (Pass 2 node aggregation). As shown in FIG. 5, lowest level Application Instance nodes, for which current data is already available, and Host Machine level nodes, for which current data is already aggregated, are depicted in FIG. 5 as triangle shaped nodes, while higher level nodes are depicted as circular notes. The application landscape may comprise multiple large distributed application programs, with each distributed Application running on multiple servers. For example, two highest level distributed Application nodes for two distributed Applications (for example, mzfinance and MZsearch) are shown in FIG. 5.

Dependencies in creation of logical nodes (hierarchies) and node aggregation are subsequently discussed with reference to particular node groupings, which are identified in FIG. 5 using dashed line blocks and corresponding legends of letters A-E. As shown in FIG. 5 there is: a dependence of node (hierarchy) creation in block B on block A; a dependence of node aggregation in block A on block B; a dependence of node (hierarchy) creation in block E on block D; and a dependence of node aggregation in block D on block E. However, there is: no dependence of node creation in block C on blocks A, B, D and E; no dependence of node aggregation in block C on blocks A, B, D and E; no dependence of node creation in block E on blocks A, B, C and D; and no dependence of node aggregation in block C on blocks A, B, D and E.

Accordingly, as illustrated in FIG. 5, if a block (parent and all its children) falls under any other block in hierarchy, then the work threads may treat node creation as dependent on the ancestor, since creation of such lower level dependant nodes may be advantageously delayed until after creation of corresponding higher level ancestor nodes. Similarly the aggregation of an ancestor block may depend upon a lower level block, because data may be advantageously aggregated from bottom up, relative to each nodal hierarchy.

Any other set of blocks may be independent of each other. In such case, this independence may be exploited to achieve scalable parallelism in the Concurrent Aggregator, wherein node creation tasks and node aggregation tasks may be identified and handed over to the pool of threads for parallel execution.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The various aspects, features, embodiments or implementations of the invention described above can be used alone or in various combinations. Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, scale to yield one or more of the following advantages for particular purposes of supporting service level requirements. Examples of such advantages are that the substantially concurrent throughput of the receiver of the invention is substantially greater than approximately fifty-thousand messages per minute, or substantially greater than approximately one-hundred thousand messages per minute, or substantially greater than approximately two-hundred-and-fifty-thousand messages per minute, or substantially greater than approximately five-hundred thousand messages per minute, or substantially greater than approximately one-million messages per minute.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

Appendix A1

Two examples of textual descriptions of Heartbeat Wrapper Objects, each originating from different Data Centers (a first example one located in Cupertino, Calif. and designated as CUP; and a second example one located in Newark, N.J. and designated as NWK).

EXAMPLE 1

```
StatEventContainer
        date : 04-09-2009 19:53
        applicationName - SRVPartitionData
        datacenter - CUP
        partition - 2
        hostname - srvpartdatap0203-apple-com
        instance - 020313
        StatEvent
                name = "Request Complete";
                totalCount = 822610;
                averageSeconds = 0.06046;
```

```
                    minSeconds = 0.0010;
                    maxSeconds = 0.419;
        StatEvent
                    name = "Time between requests";
                    totalCount = 823891;
                    averageSeconds = 0.24614;
                    minSeconds = 0.151;
                    maxSeconds = 0.547;
```

EXAMPLE 2

```
StatEventContainer
        date : 04-09-2009 19:53
        applicationName - SRVPartitionData
        datacenter - NWK
        partition - 4
        hostname - srvpartdatap0403-apple-com
        instance - 040313
        StatEvent
                    name = "Request Complete";
                    totalCount = 788630;
                    averageSeconds = 0.03128;
                    minSeconds = 0.0007;
                    maxSeconds = 0.388;
        StatEvent
                    name = "Time between requests";
                    totalCount = 788891;
                    averageSeconds = 0.16217;
                    minSeconds = 0.111;
                    maxSeconds = 0.493;
```

Appendix A2

Textual description of Event Bean examples, which are formatted by the Adapter for ingestion into the Distributed Cache.

EXAMPLE 1

```
    Event Tuple :
    Key
                path - SRVPartitionData.NWK
                date : 04-09-2009 19:53
                eventName - "Time between requests"
    Stat
                totalCount = 788891;
                averageSeconds = 0.16217;
                minSeconds = 0.111;
                maxSeconds = 0.493;
```

EXAMPLE 2

```
    Event Tuple :
    Key
                path - SRVPartitionData.CUP
                date : 04-09-2009 19:53
                eventName - "Time between requests"
```

```
    Stat
                totalCount = 823891;
                averageSeconds = 0.24614;
                minSeconds = 0.151;
                maxSeconds = 0.547;
```

EXAMPLE 3

Aggregated by Aggregator to Application Level

```
    Event Tuple :
    Key
                path - SRVPartitionData
                date : 04-09-2009 19:53
                eventName - "Time between requests"
    Stat
                totalCount = 1612782;
                averageSeconds = 0.20506;
                minSeconds = 0.111;
                maxSeconds = 0.547;
```

Appendix B1

Example textual description of instructions for configuring JMS Topic in OpenMQ.

```
Destination :
Name : app_stats
Type : TOPIC
MaxNumProducers= −1 (UNLIMITED)
MaxBytesPerMsg= −1 (UNLIMITED)
MaxTotalMsgBytes= −1 (UNLIMITED)
MaxNumMsgs=100000
LimitBehavior=REMOVE_OLDEST (in case of overflow)
```

Appendix B2

Example textual description of instructions for configuring the bounded in-memory queue of the Concurrent Throughput Receiver in OpenMQ and configuring the waiting Thread Pool.

```
CONFIGURING InMemory Queue
<!-- This queue holds 10000 messages at a time
Ideally the messages should be read by waiting threads soon as they make
it to the queue - but in the event of threads being busy forwarding the
messages the queue can build up to 10000 messages and thereafter block
the 'receiver' thread such that it doesn't read any more messages from
the topic till there is more space -- >
<bean id="queue" class="java.util.concurrent.LinkedBlockingQueue">
            <constructor-arg index="0" value="10000"/>
</bean>
```

CONFIGURING Thread Pool

```
<!-- broker factory helps creating broker threads as and when required -->
        <bean id="brokerFactory"
class="com.apple.itunes.dashboard.stats.app.receive.MessageBrokerFactory">
                <property name="destination" ref="app_stats"/>
                <property name="queue" ref="queue"/> <!-- same queue as above -->
        </bean>
        <!-- broker manager maintains all the threads. thread count can be changed in the runtime using JMX -->
        <bean id="brokerManager"
class="com.apple.itunes.dashboard.stats.app.receive.BrokerManager"
                init-method="init">
                <property name="threadCount" value="100"/>
                <property name="sleepTimeForReconnect" value="15"/>
                <property name="brokerFactory" ref="brokerFactory"/>
        </bean>
```

Appendix B3

Example textual description of instructions for configuring the JMS Bus of the Concurrent Throughput Receiver in OpenMQ.

Destination :
Name : app_stats
Type : QUEUE
MaxNumProducers= −1 (UNLIMITED)

-continued

MaxBytesPerMsg= −1 (UNLIMITED)
MaxTotalMsgBytes= −1 (UNLIMITED)
MaxNumMsgs=100000
LimitBehavior=REMOVE_OLDEST (in case of overflow)

Appendix B4

Example textual description of instructions for configuring the Distributed Cache using Oracle's Coherence Cache.

```
<!-- configuration for caches for all the levels for each app
        e.g there will be a cache for instance level for application EMailer
        with the name app.level0.EMailer.
        The data in the cache expires every 200 minutes - after just a little
        more than 3 hours
-->
<cache-mapping>
        <cache-name>app.level*</cache-name>
        <scheme-name>hubble_data_app</scheme-name>
</cache-mapping>
<!-- schema -->
<distributed-scheme>
<scheme-name>hubble_data_app</scheme-name>
<service-name>DistributedCache</service-name>
        <partition-count>16381</partition-count>
<backing-map-scheme>
        <local-scheme>
                <high-units>419430400</high-units>
                        <unit-calculator>BINARY</unit-calculator>
                        <expiry-delay>200m</expiry-delay>
        </local-scheme>
</backing-map-scheme>
<autostart>true</autostart>
</distributed-scheme>
```

Appendix B5

Example textual description of instructions for configuring Java Expert System Shell (JESS) for the Event Stream Processor.

Steps :
- Initialize JESS with the path to file(s) containing rules.
- Continuously feed the Expert System with the relevant data
- Expert System does pattern matching to find out which data set matches with rule, and fires the rules accordingly.

```
Example RULE :
;; Aggregator memory consumption goes beyond 15% for a datacenter - EMAIL the
Admins
(defrule aggregatorMemory
                 ?stat <- (ApplicationStat (appName "AppDataAggregator") (dataCenter
"hubble-repingester05") (kpi "Memory") (avgTime ?t&:(> ?t 15))))
         =>
                 (bind ?msg (str-cat "Aggregator is running higher than expected on memory.
Current consumption is beyond 15% and is " ?t "%"))
                 (assert (email (from hubble-admin@apple.com) (to hubble-admin@apple.com)
(subject "Aggregator Memory > 15% ") (message ?msg)))
         )
;; Coherence memory consumption goes beyond 70% - EMAIL the admins
(defrule coherenceMemory
                 ?stat <- (ApplicationStat (appName "CoherenceNode") (kpi
"NodeMemory")
(avgTime ?t&:(> ?t 70))))
         =>
                 (bind ?msg (str-cat "Coherence Cluster is running out of memory. Current
consumption is beyond 70% - current value is = " ?t))
                 (assert (email (from hubble-admin@apple.com) (to hubble-admin@apple.com)
(subject "CoherenceNode Memory > 70% ") (message ?msg)))
         )
;; avg System CPU load for DatabaseMachine goes beyond a threshold in a minute
(defrule coherenceMemory
                 ?stat <- (SNMPStat (dataCenter "NWK") (machineId "2034") (stat
"cpuload")
(avg ?t&:(> ?t 20))))
         =>
                 (bind ?msg (str-cat "CPU load on NWK.2034 has gone beyond 20. Current Value
:
" ?t))
(assert (email (from hubble-admin@apple.com) (to hubble-admin@apple.com)
(subject "CPU load on NWK.2034 > 20% ") (message ?msg)))
         )
```

What is claimed is:

1. An apparatus comprising:
a concurrent throughput receiver comprising an initial receiver in-memory queue sequentially arranged with a subsequent receiver queue configured as a bus for sequentially receiving a volume of event data streams, and implementing substantially concurrent throughput of the volume of event data streams; and
an event stream processor coupled with the concurrent throughput receiver for aggregating data of the event streams into aggregated data of the events.

2. The apparatus as in claim 1 wherein the event stream processor comprises:
a distributed cache of computer-readable memory; and
a concurrent aggregator coupled with the distributed cache.

3. The apparatus as in claim 1 wherein the event stream processor comprises a concurrent aggregator.

4. The apparatus as in claim 1 wherein the event stream processor comprises a multi-threaded aggregator.

5. The apparatus as in claim 1 wherein the event stream processor comprises a host machine executing a plurality of aggregation threads.

6. The apparatus as in claim 1 wherein the event stream processor comprises an event stream processing engine.

7. The apparatus as in claim 1 wherein the event stream processor comprises a query configurable state machine.

8. The apparatus as in claim 1 wherein the event stream processor includes instructions for aggregating the data of the event data streams at levels of a logical hierarchy.

9. The apparatus as in claim 1 wherein the event stream processor includes instructions for aggregating the data of the event data streams at levels of a logical hierarchy organization of sensors.

10. The apparatus as in claim 1 wherein the event stream processor includes instructions for aggregating the data of the event data streams at multiple levels of a logical hierarchy, the multiple levels of the logical hierarchy comprising at least two of: a level of application instances, a level of host machines; a level of database partitions; a level of data centers; and an application level.

11. The apparatus as in claim 1 wherein the event stream processor is adapted for transforming the data of the event data streams into complex event data.

12. The apparatus as in claim 1 wherein the event stream processor is adapted for transforming the data of the event data streams into complex event data, comprising at least one of: host machine event data; database partition event data; data center event data; and application event data.

13. The apparatus as in claim 1 further comprising:
a first client for providing a first user query of the aggregated data; and
a first server coupled with the event stream processor and the first client for serving the aggregated data to the first client in response to the query from the client.

14. The apparatus as in claim 13 further comprising a display coupled with the first client for displaying the near real time aggregated data of the events.

15. The apparatus as in claim 1 further comprising:
a display; and
a server coupled to the event stream processor, and operatively coupled to the display for displaying near real time graphical event visualization of the aggregated data.

16. The apparatus as in claim 10 further comprising:
a display; and
a server coupled to the event stream processor, and operatively coupled to the display for displaying near real time graphical event visualization of the aggregated data at the level of at the least one of: the application instances; the host machines; the database partitions; the data centers; and the application.

17. The apparatus as in claim 1 further comprising a distributed publisher for replicating the volume of event data streams.

18. The apparatus as in claim 1 further comprising a host machine executing a plurality of publish threads for replicating the volume of event data streams.

19. The apparatus as in claim 1 further comprising:
a publisher; and
a publish-subscribe exchange coupled between the publisher and the concurrent throughput receiver.

20. The apparatus as in claim 19 wherein the publish-subscribe exchange comprises a Message Oriented Middleware (MOM) publish-subscribe exchange.

21. The apparatus as in claim 19 wherein the publish-subscribe exchange comprises:
a first cluster of publish-subscribe exchange host machines provided at a location; and
a second cluster of publish-subscribe exchange host machines located geographically remote from the location of the first cluster of publish-subscribe exchange host machines.

22. The apparatus as in claim 1 wherein the concurrent throughput receiver comprises a multi-threaded subscriber.

23. The apparatus as in claim 1 wherein the initial receiver queue sequentially arranged with the subsequent receiver queue comprise at least one pair of MOM queues.

24. The apparatus as in claim 1 wherein:
the event stream processor comprises a distributed cache of computer-readable memory;
the distributed cache is sequentially arranged with the concurrent throughput receiver for sequentially receiving the volume of event data streams.

25. The apparatus as in claim 1 wherein the initial receiver queue has a configuration that is substantially different than a corresponding configuration of the subsequent receiver queue.

26. The apparatus as in claim 1 wherein the concurrent throughput receiver comprises an initial in-memory queue.

27. The apparatus as in claim 1 further comprising a concurrent adapter coupled to an input of the event stream processor for formatting the data of the volume of event data streams before being processed by the event stream processor.

28. The apparatus as in claim 1 further comprising a host machine executing a plurality of adapter threads coupled with the event stream processor for formatting the data of the event data streams.

29. The apparatus as in claim 1 further comprising a host machine executing a plurality of managed object adapter threads for formatting the data of the event data streams into managed objects.

30. The apparatus as in claim 1 further comprising:
database storage coupled with the event stream processor for archiving the aggregated data; and
a database server coupled with the database for providing time-based roll-up of the archived aggregated data.

31. The apparatus as in claim 1 wherein the throughput of the concurrent throughput receiver is implemented in accordance with terms of a service level agreement.

* * * * *